(12) United States Patent
Paciorek et al.

(10) Patent No.: US 7,136,725 B1
(45) Date of Patent: Nov. 14, 2006

(54) LOAD SHED NOTIFICATION METHOD, PRODUCT, AND APPARATUS

(76) Inventors: Ronald R. Paciorek, 1477 Hall Ct., Euclid, OH (US) 44132; Eric Schneider, 13944 Cedar Rd. #258, University Heights, OH (US) 44118

( * ) Notice: Subject to any disclaimer, the term of this patent is extended or adjusted under 35 U.S.C. 154(b) by 721 days.

(21) Appl. No.: 10/117,389

(22) Filed: Apr. 6, 2002

Related U.S. Application Data

(60) Provisional application No. 60/299,926, filed on Jun. 21, 2001.

(51) Int. Cl.
 *G05D 17/00* (2006.01)
(52) U.S. Cl. ..................................................... 700/295
(58) Field of Classification Search ................ 700/286, 700/291, 292, 295–298; 705/10
 See application file for complete search history.

(56) References Cited

U.S. PATENT DOCUMENTS

| | | | | |
|---|---|---|---|---|
| 4,155,042 | A | | 5/1979 | Permut et al. ................. 325/64 |
| 4,190,800 | A | | 2/1980 | Kelly, Jr. et al. ........ 340/310.02 |
| 4,390,876 | A | * | 6/1983 | Bjorklund et al. ............ 340/3.7 |
| 4,956,875 | A | | 9/1990 | Bernard et al. ............. 455/13.1 |
| 5,500,561 | A | | 3/1996 | Wilhelm ....................... 307/64 |
| 5,534,734 | A | * | 7/1996 | Pugh et al. .................... 307/38 |
| 5,544,036 | A | | 8/1996 | Brown, Jr. et al. ...... 340/825.24 |
| 5,572,438 | A | | 11/1996 | Ehlers et al. ................ 700/295 |
| 5,576,700 | A | | 11/1996 | Davis et al. ................ 340/3.31 |
| 5,673,252 | A | * | 9/1997 | Johnson et al. .............. 370/449 |
| 5,684,710 | A | * | 11/1997 | Ehlers et al. ................ 700/293 |
| 5,696,695 | A | * | 12/1997 | Ehlers et al. ................ 700/286 |
| 5,761,083 | A | | 6/1998 | Brown, Jr. et al. .......... 700/296 |
| 6,058,355 | A | | 5/2000 | Ahmed et al. ................. 702/62 |
| 6,097,108 | A | * | 8/2000 | Tweed .......................... 307/31 |
| 6,104,582 | A | | 8/2000 | Cannon et al. ................. 361/1 |
| 6,157,292 | A | | 12/2000 | Piercy et al. ........... 340/310.01 |
| 6,167,389 | A | | 12/2000 | Davis et al. ................. 705/412 |
| 6,169,476 | B1 | | 1/2001 | Flanagan ................ 340/286.02 |
| 6,181,985 | B1 | | 1/2001 | O'Donnell et al. .......... 700/295 |
| 6,259,972 | B1 | | 7/2001 | Sumic et al. ................ 700/286 |
| 6,356,422 | B1 | | 3/2002 | Bilac et al. ................. 361/93.1 |
| 6,509,833 | B1 | | 1/2003 | Tate .......................... 340/539.1 |

(Continued)

OTHER PUBLICATIONS

Advanced Control Systems, Inc.; *Load Management*; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.

(Continued)

*Primary Examiner*—Maria N. Von Buhr

(57) ABSTRACT

At a first time, an authorized directive is received by the utility provider to perform an operative action for shedding load of a power system by a minimum system load value on or before a second time. The utility provider may operate the SCADA/DCS system to assist in selecting a set of circuits wherein the total circuit load value of the selection is greater than or equal to the minimum system load value. In response to circuit selection, the SCADA/DCS system selects the corresponding set of circuit breakers and consults the circuit-subscriber notification database to select a set of subscribers corresponding to the selected set of circuits. A system, product, and/or device adapted for communicating data in response to circuit selection may then be accessed by the SCADA/DCS system to communicate to the selected set of subscribers an intention of performing the operative action on or before the second time. The utility provider may then program and/or operate the SCADA/DCS system to perform the operative action upon the selected set of circuit breakers on or before said second time.

48 Claims, 13 Drawing Sheets

U.S. PATENT DOCUMENTS

| | | | |
|---|---|---|---|
| 6,665,620 B1 | 12/2003 | Burns et al. | 702/62 |
| 6,671,585 B1* | 12/2003 | Lof et al. | 705/36 R |
| 6,751,562 B1* | 6/2004 | Blackett et al. | 702/61 |
| 2001/0010032 A1* | 7/2001 | Ehlers et al. | 702/62 |
| 2002/0024424 A1 | 2/2002 | Burns et al. | 340/310.01 |
| 2002/0103745 A1* | 8/2002 | Lof et al. | 705/37 |
| 2002/0194113 A1* | 12/2002 | Lof et al. | 705/37 |
| 2004/0088083 A1* | 5/2004 | Davis et al. | 700/295 |
| 2004/0107025 A1* | 6/2004 | Ransom et al. | 700/286 |

OTHER PUBLICATIONS

American City Business Journal, Inc.; *Blackout early warnings mandated*; Apr. 3, 2001; USA; paragraphs 1, 2, 5, 6.

Bradley, J.; *ISO Blackout Notice Plan Follow-Up*; Silicon Valley Manufacturers Group & California Independent System Operator (CAISO); May 8, 2001; p. 1, paragraphs 1, 2, 3, 4; p. 2, paragraphs 1, 3, 4.

California, State of; *Energy Action Plan*; May 20, 2003; USA; p. 5, Section I; pp. 7 & 8 Section V.

California Independent System Operator; *California Independent System Operator Participant's whom have entered into an Interruptible Service Contract or similar agreement*; California Independent System Operator (CAISO); Dec. 10, 2002; p. 1.

Desmond, J.; *Customer Centric Alert and Response Program Overview*; California Independent System Operator (CAISO); May 24, 2001; USA; pp. 2, 3, 4, 5, 6, 12, 13, 17, 18.

Goldman, C. A.; Kintner-Meyer, M.; Heffner, G.; *Do "Enabling Technologies" Affect Customer Performance In Price-Responsive Load Programs?*; LBNL-50328; Ernest Orlando Lawrence Berkeley National Laboratory; http://eetd.lbl.gov/EA/EMP/; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Graves, K.; *CAISO Summer 2001 Assessment*; California Independent System Operator (CAISO); Mar. 22, 2001; USA; p. 29, paragraphs 1 & 2; p. 30, paragraphs 1, 2, Figure III-E.

Graves, K.; *CAISO Feb. 2001 Winter Assessment and Summer 2001 Post-season Summary*; California Independent System Operator (CAISO); Oct. 8, 2001; USA; pp. 17 & 18, Section IV.

Gross, G.; *FCC moves ahead with powerline broadband rules*; IDG News Service; Feb. 13, 2004; USA; paragraphs 1, 2, 6, 9.

Guardino; *Board of Govenors: Notification Plan 2*; California Independent System Operator (CAISO); May 21, 2001; USA.

Helman, C.; *For years electric companies have dreamed of making their wires the high-speed data pipe to your PC. One tech company may yet make the dream possible.*; Forbes.com; Jan. 20, 2003; USA; paragraphs 1, 2, 3, 4, 5.

Jonker, R.; Dijak, P.; *Enabling Distributed Generation and Demand Response with Enterprise Energy-Management Systems*; Darnell.com, Inc.; May 17, 2001; USA; p. 1, paragraphs 1 & 2; p. 2, paragraphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.

Keoni, A.; *California Independent System Operator Load Program Participants*; California Independent System Operator (CAISO); Apr. 8, 2002; pp. 1, 2, 3.

Keoni, A.; *Implementation Plan and Required Information For the Participating Load Program (PLP)*; California Independent System Operator (CAISO); Aug. 8, 2002, USA; p. 1, paragraphs 2 & 3; p. 2, paragraphs 1 & 2, Table 1.

Labaton, S.; *F.C.C. Begins Rewriting Rules on Delivery of the Internet*; Associated Press; Feb. 13, 2004; USA; paragraphs 1, 2, 6, 7.

Lyon, D.; *The Development of Electric System Emergencies and the Emergency Response Communication Network : White Paper*; California Independent System Operator (CAISO); Jun. 20, 2001; USA; p. 2, paragraphs 1 & 4; p. 3, paragraph 1 & Section II; pp. 6, 7, 8, 9; p. 10, Section III, paragraphs 1, 2, 3; p. 11, paragraphs 2 & 3; p. 12, paragraph 1; p. 13, paragraph 4; p. 14.

Motegi, N., Piette, MA.; *Web-based Energy Information Systems for Large Commercial Buildings*; Ernest Orlando Lawrence Berkeley National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.

Norman, J.; *Southern Telecom® and Main.net Announce Successful Demonstration of Broadband over Power Lines*; Southern Telecom; Dec. 2003, p. 1.

Oesterreichishe Gesellshaft fur Umwelt und Technik; *iea-experts group on r&d priority setting and evaluation liberalisation of the electricity market*; http://www.oegut.at; Mar. 18, 2002; Austria (in English); pp. 4 (Sections 3 & 4), 7 Section 3), 8 (Controllable "Dispatchable" Loads; Section 2), 9 (Distributed Energy Resources).

O'Neil, E.; *Cumulative Totals of No-Touch, Restricted Maintenance Operations, Alert, Warning, Emergency and Power Watch Notices Issued from 1998 to Present*; California Independent System Operator (CAISO); May 29, 2003; USA; p. 4, Table; p. 5, Table; p. 6, Table; p. 7, Table; p. 8, Table; p. 9, Table; p. 10, Table; p. 11, Table; p. 12, Table; p. 14, Table.

Perez-Pena, R.; *Utility Could Have Halted '03 Blackout, Panel Says*; New York Times; http://www.nytimes.com/2004/04/06/national/06BLAC.html; Apr. 6, 2004; USA; paragraphs 1, 2, 3, 4, 9.

Purdum, T.; *Statewide Blackouts Ordered as Heat Strains California Grid*; New York Times; May 8, 2001; USA; paragraphs 3, 4, 5, 8, 9.

Schmid, E., McCorkle, S., O'Neil, E.; *ISO Electric Emergency Notification: Memorandum*; California Independent System Operator (CAISO); May 17, 2001;USA; p. 1, paragraphs 1 & 4; p. 2, paragraphs 1, 2, 3; p. 3; p. 4, paragraph 4 & 5; p. 5; p. 6, paragraph 1, p. 7; p. 8.

Schmid, E.; *Electric Emergency Notification*; California Independent System Operator (CAISO); May 24, 2001; USA; pp. 3, 4, 5, 6, 7, 8, 9, 10, 12, 13, 14, 15, 16, 17, 18, 19, 20.

United State of America, Federal Energy Regulation Commission; *National Transmission Grid Study, Consolidated List of Recommendations*; FERC; May 6, 2002, USA; pp. 2 /76 & 3/77 Section 4, 5/79 Section 5.

Weiss, J.; *EPRI's Enterprise Infrastructure EPRI's Enterprise Infrastructure Security (EIS) Program Security (EIS) Program*; Jul. 7, 2000; USA; pp. 2 through 24.

Weller, G. H.; *A Case Study Review of Technical and Technology Issues for Transition of a Utility Load Management Program to Provide System Reliability Resources in Restructured Electricity Markets*; LBNL-52408; Ernest Orlando Lawrence Berkeley National Laboratory; http://certs.lbl.gov/; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.

Werst, K.L.; *Why Rotating Outages?*; California Independent System Operator (CAISO); Aug. 17, 2001; USA; paragraphs 1, 2, 3, 5, 6, 7.

\* cited by examiner

| Circuit # | Account # | Method | IP Address | E-mail | Phone number | GPS Data | ICQ/IM | Cable ID |
|---|---|---|---|---|---|---|---|---|
| 21-1001 | elec2111 | Phone | 31.41.59.26 | a@b.com | 216-555-1234 | 48.33-45.22 | AlertMe99 | cust1 |
| 21-1002 | elec2114 | Grid | 27.18.28.18 | b@c.com | 330-555-4321 | 49.44-21.38 | 487344 | cust2 |

Encoded data: Header | Public Key Digital ID | Query | Encoded bit mask | Content | TTL | Hash value | Error correction

LOAD SHED NOTIFICATION METHOD, PRODUCT, AND APPARATUS

CROSS REFERENCE TO OTHER RELATED APPLICATIONS

This application claims the benefit of the following patent applications, which is hereby incorporated by reference:

1. U.S. Provisional Application Ser. No. 60/299,926 filed Jun. 21, 2001, by Paciorek, et al., entitled "Load shed notification method, product, and apparatus."

2. U.S. patent application Ser. No. 09/440,606 filed Nov. 15, 1999, by Schneider, entitled "Method and apparatus for information delivery", which claims the benefit of U.S. patent application Ser. No. 08/900,437 filed Jul. 25, 1997, by Schneider entitled "Method and apparatus for periodically updating data records having an expiry time", now U.S. Pat. No. 5,987,464.

DOCUMENT DISCLOSURE PROGRAM

The provisional application for patent is based on the following disclosures filed under the Document Disclosure Program:

Disclosure Document No. 495,286 filed on Jun. 15, 2001.
Disclosure Document No. 494,945 filed on Jun. 11, 2001.
Disclosure Document No. 493,114 filed on May 4, 2001.

BACKGROUND OF THE INVENTION

1. Field of the Invention

This invention generally relates to notification systems, and more specifically relates to a method, product, and apparatus for notifying subscribers of alerts, warnings, and emergencies.

2. Description of the Related Art

Commercial electrical power available today is becoming unreliable due to the growing number of electrical loads placed on the electrical power grid. Electric power supply has not kept pace with demand. Electric generation facility construction is heavily regulated and new sources of electric power have not been built to meet current demands. Many existing electric generation facilities are producing electricity below their maximum capacity because they are old, hence require more maintenance downtime than newer facilities. With the decrease in electrical generation and without a corresponding decrease in electrical demand, the Western U.S., especially California, is experiencing electrical supply shortages.

The California Independent System Operator (ISO) is charged with managing the flow of electricity along the long-distance, high-voltage power lines that make up the bulk of California's transmission system. The not-for-profit public-benefit corporation assumed the responsibility in March, 1998, when California opened its energy markets to competition and the state's investor-owned utilities turned their private transmission power lines over to the California ISO to manage. The mission of the California ISO is to safeguard the reliable delivery of electricity, facilitate markets and ensure equal access to a 12,500 circuit mile "electron highway."

Operating a power grid, one of the most complex and dynamic technological systems requires extraordinary amounts of data and the ability to respond to rapidly changing circumstances. Supply and demand conditions will at times require grid operators to interrupt services to customers in order to maintain the integrity of the power system. Failure to balance the amount of power generated and the amount consumed creates system instability that could culminate in the collapse of the electric power system in the entire western United States. Grid operators anticipate conditions, such as insufficient operating reserves, that could lead to a collapse of the grid and avert them by implementing contingencies, such as load shedding and controlled outages known as rotating outages or rolling blackouts. Operating Reserve is the margin of generating resource above that is required to meet consumer demand. This margin is necessary to maintain reliability and as protection against the sudden loss of a generation resource. An Operating Reserve deficiency is oftentimes foreseeable in the day-ahead or hour-ahead markets and, if not corrected, may require intervention in the real-time operation.

Emergency Notices specifically relating to deficiencies in Regulation or Operating Reserve are issued by the ISO based on the level of severity:

Stage 1: Actual or anticipated Operating Reserves are less than Minimum Operating Reserve Criteria;

Stage 2: Actual or anticipated Operating Reserves are less than or equal to five percent (5%);

Stage 3: Actual or anticipated Operating Reserves are less than or equal to one and one half percent (1.5%).

Immediately after the ISO declares an emergency, an extensive network of communications is activated. The ISO initiates and pursues communications with state and federal agencies, market participants, the media, and industry organizations charged with western-wide reliability monitoring. These communications are accomplished by a wide variety of means: e-mail, telephone, radio, pagers, and web postings. Once the Shift manager of ISO real-time grid operations declares an Electrical Emergency (Emergency Stage One, Two or Three), the Shift Manager notifies the Executive In Charge (EIC). The EIC notifies the Public Information Coordinator (PIC) and the Emergency Response Coordinator (ERC). This activates the ISO Emergency Response Team. The Shift Manager, the EIC, the PIC, and the ERC then must engage other channels.

With the ISO Emergency Response Team activated, the Shift Manager directs the Grid Resource Coordinator to post the Emergency Notice on the System Status page of the California ISO Website. This automatically triggers an email to be sent to Market Participants and key ISO personnel, and also triggers the posting of an ISO Emergency Notice on the Emergency Digital Information System (EDIS) Website that is hosted by the Governor's Office of Emergency Services. Subscribers can receive email, pages, faxes and/or pocket radio communications that indicate when new notices have been posted. In addition, other web sites such as "www.incident.com", "www.outofpower.com", and "www.infotility.com" also provide notification services by forwarding ISO updates to their subscribers.

When a Stage 2 Emergency Notice is declared, interruptible service is made available to the ISO by the Utility Distribution Companies (UDCs). This Interruptible Service program was developed through arrangements with subscribing end-use customers to shed load under special UDC tariffs within the jurisdiction of California Public Utilities Commission (CPUC). Under a Stage 2 Emergency, direct notification is limited to interruptible customers who are directed via remote terminal units (RTUs) or phone to curtail their interruptible loads. These programs provide incentives for summer on-peak capacity [kW] savings in addition to the incentive for energy [kWh] savings. Program participants are required to curtail electric consumption during peak times, and thereby conserving energy resources. It is imperative that program participants curtail their share of electricity immediately upon a Stage 2 Emergency declaration. Failure to promptly curtail their share of the electric load results in stiff penalties and risks placing the entire power grid in a Stage 3 Emergency.

Upon notification of a Stage 3 Emergency by the ISO, having determined the aggregate amount of load that must be curtailed in the control area as a whole, the Shift Manager on duty orders the participating utilities (e.g., Pacific Gas & Electric (PG&E), Southern California Edison (SCE), and San Diego Gas & Electric, etc.) to reduce load in their service territories. Once the ISO orders a specified amount of load shedding from a utility's service territory, the utility determines which geographical regions or blocks will be interrupted. The utilities may delegate a percentage of that load reduction amount to municipalities (e.g., Vernon, Pasadena, etc.) within their service territory with whom they had pre-existing contracts with for sharing in load reductions.

Utility companies then notify customers by sending e-mail non-residential customers (interruptible customers and those who request updates of system conditions), making manual or automated telephone calls to residential customers on life support (critical care) and customers with demands greater than 300 kW, posting location of interruptions on website (affected blocks), providing press releases and live interviews notifying customers of emergency and identifying location of interruptions, and establishing pre-recorded messages for customers calling the customer's service centers.

When an ISO directs a load shed, utilities have to respond quickly to identify blocks of commercial and residential customers whose consumption matches the target power figure and switch off their power. PG&E's more than 13 million electricity customers have been divided into 15 blocks, based on the load of each circuit. Each block, accounting for about 500 megawatts of usage, covers about 200,000 customers in neighborhoods scattered throughout PG&E's Northern and Central California service area. Each PG&E customer is assigned to one of 2,900 circuits. Approximately 1,000 circuits contain essential customers and are exempt from rotating outages. Under the CPUC's rules, only those circuits that serve specifically designated classes of customers who provide essential public health, safety, and security services (such as large hospitals and fire and police stations) are exempted from these outages. The remaining 1,900 circuits are divided across the 14 blocks. Customers are being notified to review their PG&E bill on a regular basis to determine which outage block they have been assigned.

SCE has identified the circuits available for use in rotating outages according to CPUC rules. A circuit is an overhead or underground electrical line that supplies power to a combination of residential and/or commercial customers. These circuits have been arranged into groups. Each group includes a number of circuits that comprise approximately 100 megawatts of electricity usage per group, with each circuit generally serving between 800 and 2,000 customers. The amount of power ISO designates for curtailment will determine the number of groups that are interrupted at any one time (e.g., if ISO calls for 500 megawatts, SCE would interrupt service to about five groups). The groups will be interrupted, as operating conditions permit, and each outage is expected to last about one hour. At the end of the hour, service will be restored to the affected groups and the next groups on the list will be interrupted to maintain the amount of load requested by the ISO. Once a group has been used in a rotating outage, it is moved to the bottom of the list.

The active notification of end-use customers of Stage 2 and 3 Emergencies is critical to protecting their health and safety. Sudden loss of electrical power has dramatic consequences that compromise public safety, property damage, loss production, and economic losses. Immediate notification of an impending change event or condition is instrumental in reducing loss of life, reducing personal injury, or reducing economic losses. Certain utility customers need advanced notification in order to respond to the imminent power outage where they would light generators and switch to generator power, halt vital manufacturing processes, properly shut down equipment via standard operating procedures, escort customers or employees away from hazardous areas, or cordon secure areas.

Advanced notice of an impending power outage has many advantages. Law enforcement personnel can be dispatched to intersections to aid in directing traffic, or increase patrols where regular security measures are compromised by the power outage. Electric transportation systems can curb service before an imminent power outage to prevent passengers from being stranded above ground, or in a tunnel. High-rise office buildings, retailers, and residential buildings can halt elevator service to prevent passengers from becoming stranded. Electric utility customers who have standby generators are afford the opportunity to light off auxiliary generators, run them until they reach proper operating parameters, and then shift the load from utility power to auxiliary power.

Manufacturers, petroleum refineries, chemical companies, or pharmaceutical companies can halt their vital processes ahead of the scheduled power outage. Building maintenance personnel are able to properly de-energize ventilation systems, or shift to auxiliary lighting and ensure that other sensitive equipment is powered-down to prevent surge damage. This will prevent surge damage to expensive equipment or prevent product damage. Office personnel are afforded adequate time to back-up their data or complete critical actions or reschedule critical events. Web and application servers shift responsibilities to non-affected servers so that affected servers may be safely shut down.

General California electrical emergency warnings are broadcast via television, radio, Web sites, or Email. To receive an electrical emergency notice broadcast requires that a receiver be turned on, and at least one person's attention focused on the receiver. Most TV and radio receivers do not have Uninterrupted Power Supplies (UPS), which render them inoperable during power failure, and therefore would not provide critical communications. Further, electrical emergency warnings broadcast in this manner are general in nature and typically provide unnecessarily widespread geographic area warnings. The warnings communicate the system status of the power grid, general location of predicted rotating outages, and not the specific circuits that will be affected by the load shed. In addition, sources of notification such as the CAISO System Status Web site may be vulnerable to excessive Internet traffic, server downtime, denial of service attacks, and the like.

Further disadvantages of current notification schemes may include the delay or notification failure attributable to dialing, pager, FAX and cellular telephone numbers, even if automated, to offline Internet or cellular systems, to Internet or cellular system traffic, to non-automated notification processes, to gaps within business notification systems such as one key recipient attempts to notify an entire business, and notification failure due to Internet packet loss.

In order to circumvent many of the existing problems and provide California power customers with adequate advanced notification, Governor Gray Davis issued an Executive Order on Thursday, May 24, 2001 requiring ISO to provide sixty minutes advanced notice (instead of thirty minutes) of a load shedding event. The Executive Order provides non-affected customers with ample time to curtail non-essential equipment in order to avert a load shedding, and provide affected utility customers with more time to shut-down equipment before electric curtailment. Consequently, the electric load over the entire grid is reduced and a directed load shedding may be averted because of the additional time of advanced notice.

As of May 24, 2001 ISO communicated 62 thirty minute load-shed notices since the beginning of the year, 38 instances of which electric curtailment did not occur. Since load shedding was not experienced 61% of the time after a load shed communication, utility customers may take future load shed communications less seriously, and subsequently delay or refrain from taking action since shutting down a business unnecessarily affects their bottom line. Also during 2001, advanced customer warning was provided once. In short, electric loads are dynamic, and load-shed directives may be delayed, cancelled, accelerated, or a load shedding may occur with little or no advanced warning.

There is no known single system for providing circuit specific rotating outage notification to utility customer critical personnel or providing such circuit specific notification in combination with existing Stage 1, Stage 2, Stage 3, notice updates, or notice cancellations of electric emergencies provided by a combination of many vendors and/or many systems.

Power company alerts, warnings, and emergencies are instituted to benefit utility customers and the public, but current communications do not provide optimal benefits because timely information is not communicated to key personnel efficiently. Accordingly, in light of the above, there is a strong need in the art for a system and method of more reliably, effectively, and accurately delivering load shed notification services to customers and subscribers.

SUMMARY OF THE INVENTION

The present invention provides specific, instantaneous, timely, accurate, and reliable means for a power company to notify affected utility customers of existing electrical load conditions, especially an imminent power outage. The invention provides notification of all system status changes including alert, warning, and emergency notices. The present invention enables targeted broadcasting of notifications for selected customers over a wide geographical area. The invention enables utility customer personnel the ability to perform operative actions, such as established emergency protocols and power outage procedures, in response to receiving notification. The present invention provides efficient utilization and conservation of energy resources.

The present invention provides reliable instant location specific notification to nearly an unlimited number of recipients contemporaneously according to their notification preferences. The invention provides single notification to a manager of several geographically dispersed facilities, or multiple notifications to different personnel within a single facility. The present invention automates and streamlines the notification process. The invention automatically activates a number of devices or performs a number of operative actions in response to subscriber notification. The present invention provides recipients with as much time as possible to complete emergency procedures. The invention provides recipients with continuous updates including load shed cancellation.

The present invention enables integration of subscriber-circuit contact information in order to provide automated notification in response to load shed circuit selection. The invention reduces the costs, number of people, and the number of hardware elements needed to provide a load shed notification system. The present invention enables encrypted secure communications to reduce the likelihood of unauthorized disclosure of information during notification. The invention reduces notification transmission error rate by providing redundant notification data signals sent over different communication networks. The present invention provides appropriate emergency response and law enforcement personnel advance notice of a local outage. The invention reduces loss due to theft and vandalism by preventing prior access to sensitive information regarding targeted outage areas.

In general, in accordance with the present invention in a power system serving a plurality of subscribers, the power system having at least one control system for operating a power grid including a plurality of circuits and a plurality of circuit breakers, each circuit having a circuit load value and at least one circuit breaker, a method includes the steps of receiving at a first time an authorized directive to perform an operative action for shedding load of the power system by a minimum system load value on or before a second time, selecting a set of circuits from the plurality of circuits, wherein a total circuit load value of the selected set of circuits is greater than or equal to the minimum system load value, selecting a set of subscribers from the plurality of subscribers, the set of subscribers corresponding to the selected set of circuits, and communicating information to the selected set of subscribers with a communication network in communication with the plurality of subscribers, the information including an intention of performing the operative action on or before the second time.

In accordance with another aspect of the present invention in a power system serving a plurality of subscribers, the power system having a control system for operating a power grid including a plurality of circuits and a plurality of circuit breakers, each circuit having a circuit load value and at least one circuit breaker, a method includes the steps of receiving at a first time an authorized directive to perform an operative action for shedding load of the power system by a minimum system load value on or before a second time, in response to receiving the directive, selecting a set of circuits from the plurality of circuits, wherein a total circuit load value of the selected set of circuits is greater than or equal to the minimum system load value, in response to selecting the set of circuits, selecting a set of subscribers from the plurality of subscribers and selecting a set of circuit breakers from the plurality of circuit breakers, the set of subscribers and the set of circuit breakers corresponding to the selected set of circuits, and with a communication network in communication with the plurality of subscribers, communicating information to the selected set of subscribers, the information including an intention of performing the operative action on or before the second time, and performing the operative action upon the selected set of circuit breakers on or before the second time.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

Figure 1A:
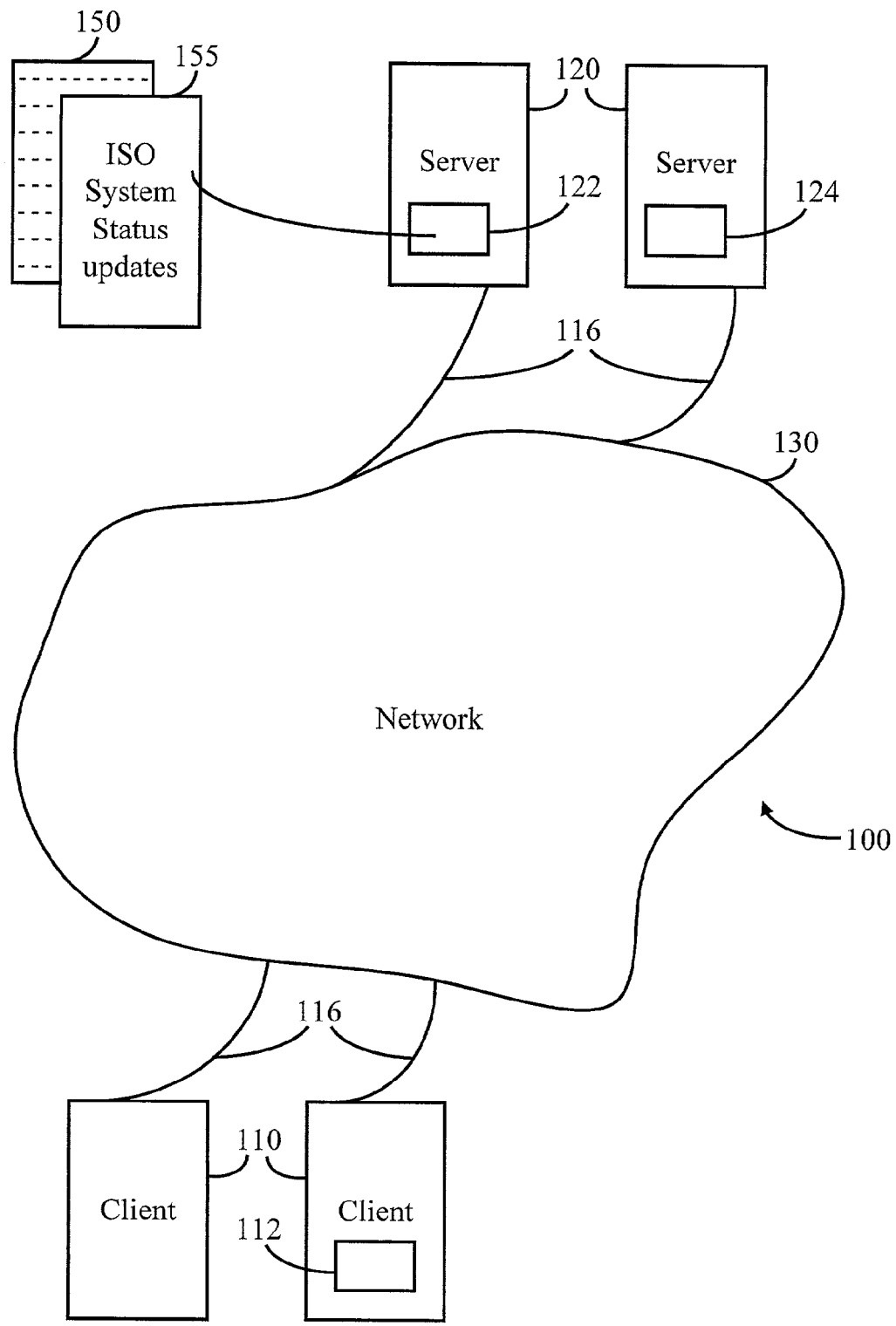
FIG. 1a is a block diagram of an exemplary distributed computer system in accordance with the present invention.

The present invention will now be described with reference to the drawings, wherein like reference numerals are used to refer to like elements throughout. FIG. 1a illustrates an exemplary system for providing a distributed computer system 100 in accordance with one aspect of the present invention and may include client computers or any network access apparatus 110 connected to server computers 120 via a network 130. The network 130 may employ Internet communications protocols (IP) and/or suite of other protocols or standards such as but not limited to Ethernet, TCP/IP, ATM, LDAP, X10, CEBus, SmartHouse, Medialink, Lonworks, Powerline, IEEE-1394, Home API, HAVI, HomeRF, HomePNA, Universal PnP, or Jini, etc. to enable network access devices 110, which may be configured as clients, to communicate with each other and to servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, peer-to-peer networking service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors, memories, and input/output devices. An input device may be any suitable device for the user to give input to client computer 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

For example, input/output device may be a standard touch-tone telephone. However, the network transport may be intercom circuits, Integrated Services Digital Network (ISDN) lines, T1 lines, POTS lines, modem lines, video lines, and Ethernet Hub. Advanced network information such as Automatic Number Identification ("ANI") (also known as caller ID) and Dialed Number Identification Service ("DNIS") may be passed by the network and recognized by the system. ANI or DNIS may be used to identify area code of the subscriber, registrant, or customer accessing the system 100.

Telephony circuits may include, among other circuits, circuits for interfacing with input/output devices. These circuits may include a voice circuit having a touch-tone recognition circuit and voice processing circuit, as well as other functions. Other circuits may include switching circuits, text to speech circuits, facsimile ("fax") circuits, automatic speech recognition circuits, multimedia circuits, modem circuits, video circuits, and adapter circuits. These circuits may enable subscribers or others to input information by way of touch tones, pulses, voice, video, or equivalents thereof. Other input and output devices for accessing system may also include television signals, wireless communication devices, Internet devices and electronic mail devices. In alternate embodiments, voice recognition signatures may be recognized by a system using speech recognition circuits.

The servers 120 may be similarly configured. However, in many instances server sites 120 include many computers, perhaps connected by a separate private network. In fact, the network 130 may include hundreds of thousands of individual networks of computers. Although the client computers 110 are shown separate from the server computers 120, it should be understood that a single computer may perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page. One web page in particular, is a system status web page 155 hosted by the California ISO web site, which serves as the sole-source provider for the notification of emergency load shedding for the State. Current system status may be periodically accessed at the following web site, "http://www.caiso.com/awe/systemstatus.html". Other information providers may mirror this web site.

Figure 1B:
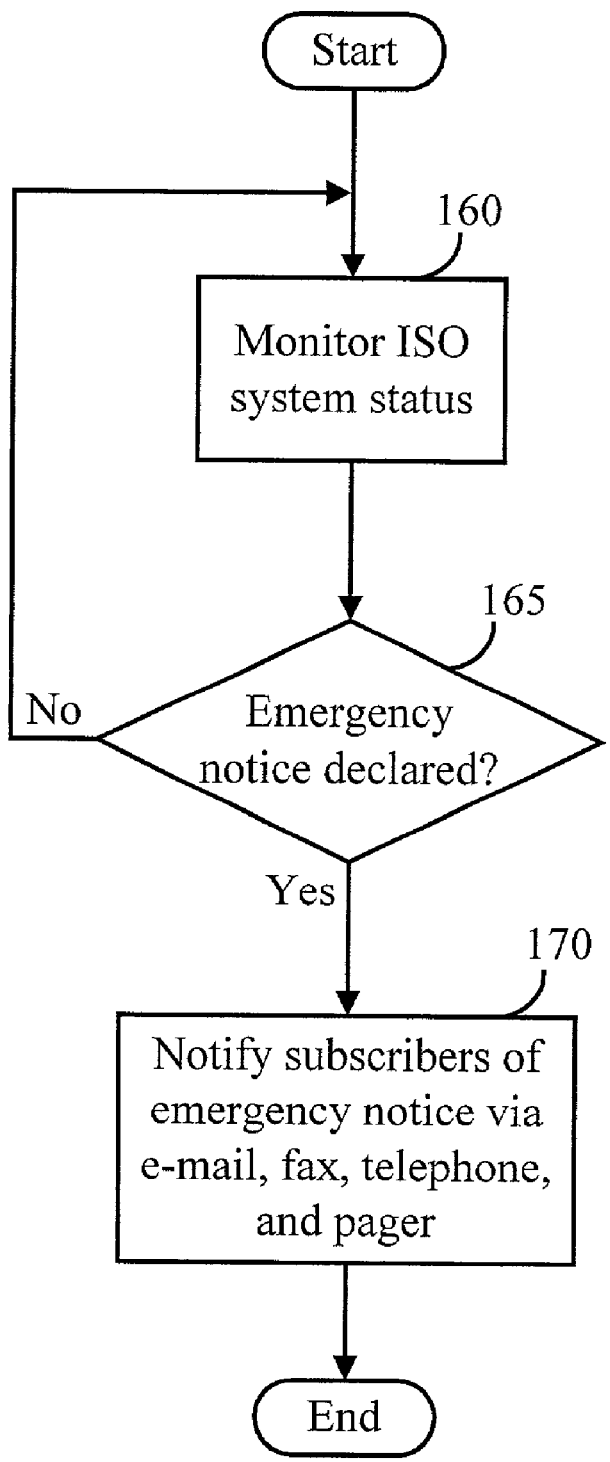
FIG. 1b is a flowchart illustrating the steps performed by a prior art system for providing notification services.

FIG. 1b is a top-level flowchart illustrating the steps of a prior art system for notifying subscribers of an emergency load shed. Due to the fact that ISO is the sole-source provider of alert, warning, and emergency notices, a myriad of third party vendors have emerged by providing value added solutions for relaying such ISO updates to subscribers and the public at large. In all cases, all known solutions can be illustrated in FIG. 1b. A notification system provides the ability to monitor the real-time system status of the ISO web site in step 160. This can be accomplished by periodically polling the system status web page 155. In each case, it can be determined in step 165 whether an emergency notice has been declared by the ISO. If there is no updated notice, the notification system continues to monitor system status (step 160) until it is determined (step 165) that an emergency notice has been declared. Upon detection of the system status update, subscribers may then be relayed of the notification in step 170 through a variety of communication media such as fax, telephone, e-mail, pager, interactive voice response (IVR), and the like.

Figure 2A:
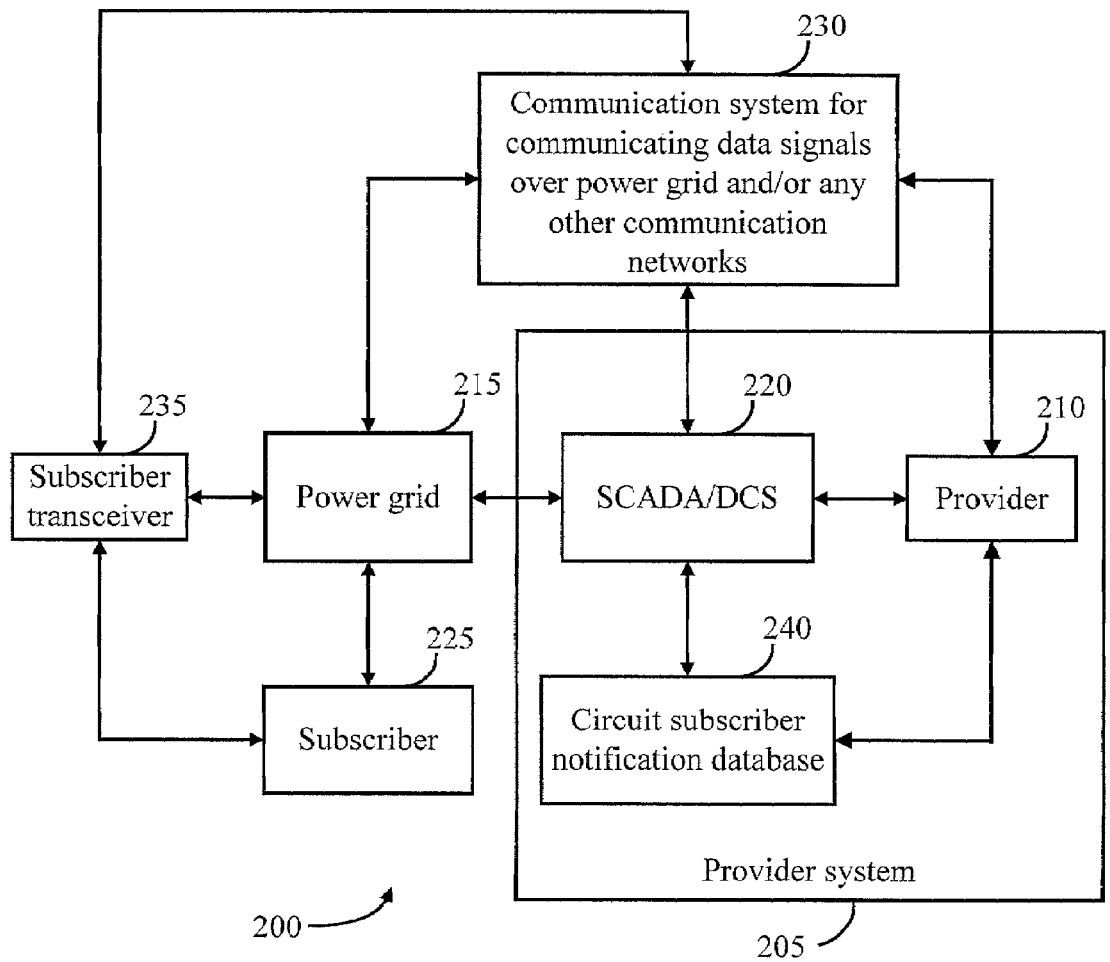
FIG. 2a is a block diagram of an exemplary distributed power system in accordance with the present invention.

FIG. 2a is a block diagram of an exemplary distributed power system in accordance with the present invention. In general, electricity is generated at a generating plant, transformed for transmission over distances across a power grid 215, and transformed again for the distribution to customers/subscribers 225. A distributed power system 200 includes a power grid 215 in operative association with a provider system 205 having a Supervisory Control and Data Acquisition (SCADA) system and/or Distributed Control System (DCS) 220 that is monitored and operated by a utility provider 210 such as a Power Transmission Owner (PTO) or Utility Distribution Companies (UDCs) and the like. The power grid may be a single grid further coupled to a network of power grids which may be operated by one or more utility providers to offer unified services, including electrical power services, across multiple political subdivisions such as a village, town, city, county, state, region, province, and country.

A communication system 230 for communicating data signals over the power grid(s) 215 and/or other communication systems 100 and networks 130 may also be in operative association with the SCADA/DCS system 220 enabling communication between providers 210 and subscribers 225 for the purpose of billing, metering, servicing, notifying and the like. Subscribers 225 may also have a subscriber transceiver 235 such as a modem, network interface device, or any device adapted to receive data signals from the provider 210 via a multitude of communication networks 130 including the power grid 215 itself as a communication network. The subscriber transceiver may further be operatively coupled to (not shown) customer premise equipment such as intercoms, PBX, and Centrex system or coupled with a home automation network via X10 and CEBus protocols, etc., for further communication of notification information within the customer's premises.

In addition, a circuit-subscriber notification database 240 is also in operative association with the SCADA/DCS system 220 enabling the provider 210 to perform targeted notification services to subscribers 225 via the communication system 230. The circuit-subscriber notification database 240 (discussed in conjunction with FIG. 5a) is a component in a preferred embodiment of the present invention. Though it is common for providers to have communication mechanisms with respect to their customers/subscribers 225, there remains to date no known system in place for communicating with subscribers based on which circuit the customer is drawing load from (subscribing to). When the provider determines which circuits to shed load from in the event of having to perform a load shed or rotating outage, subscribers 225 affected by these selected circuits can now be immediately notified by having the SCADA/DCS system 220 access/consult the circuit-subscriber notification database 240 and communicate the emergency notice to subscribers 225 via the communication system 230.

Figure 2B:
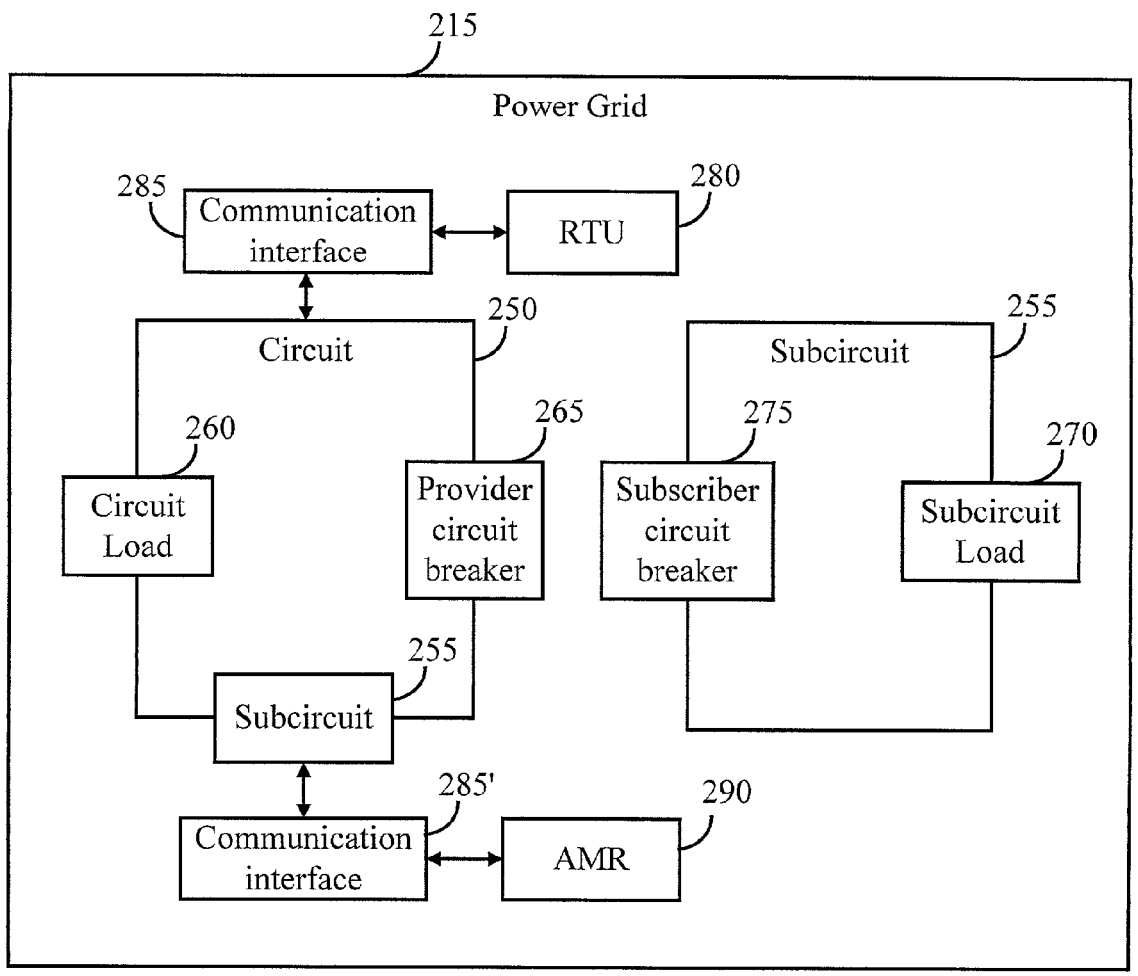
FIG. 2b is a block diagram of an exemplary power grid in accordance with the present invention.

FIG. 2b is a block diagram of an exemplary power grid in accordance with the present invention. In a power grid 215, there is a plurality of circuits 250, with each circuit having one or more subcircuits 255. A circuit is an overhead or underground electrical line that supplies power to a combination of end users such as residential and/or commercial customers within a geographical area.

Each circuit 250 has a circuit load 260 and at least one provider circuit breaker 265. In a preferred embodiment of the present invention, each provider circuit breaker 265 is in operative association with the SCADA/DCS system 220 so that the utility provider 210 may have remote operative and programmable control over each circuit 250 via the SCADA/DCS or similar system 220. In addition, a remote terminal unit (RTU) 280 having a communication interface 285 may be operatively coupled to each circuit 250. RTUs are primarily used as field devices for reporting circuit data (e.g., load data, environmental data, etc.) back to the SCADA/DCS system 220 via the communication interface 285. Such circuits reside at utility substations and may further include (not shown) other remote SCADA systems for reporting circuit data back to the SCADA/DCS system 220 via the circuit communication interface 285. Furthermore such remote SCADA systems and RTUs 280 may be used as distribution points for communicating circuit-specific notification data to subscribers. Powerline carrier technologies may be employed for communicating notification data across powerlines from the utility substation to each subscriber load.

Each subcircuit 255 has a subcircuit load 270 and at least one subscriber circuit breaker 275. In addition, a utility meter having a subcircuit communication interface 285' also called an automated meter reader (AMR) 290 may be operatively coupled to each subcircuit 250. Utility meters are primarily used for measuring subscriber loads for billing purposes. AMRs can report subscriber/customer usage including load data back to the SCADA/DCS system 220 via the communication interface 285'.

Figure 3A:
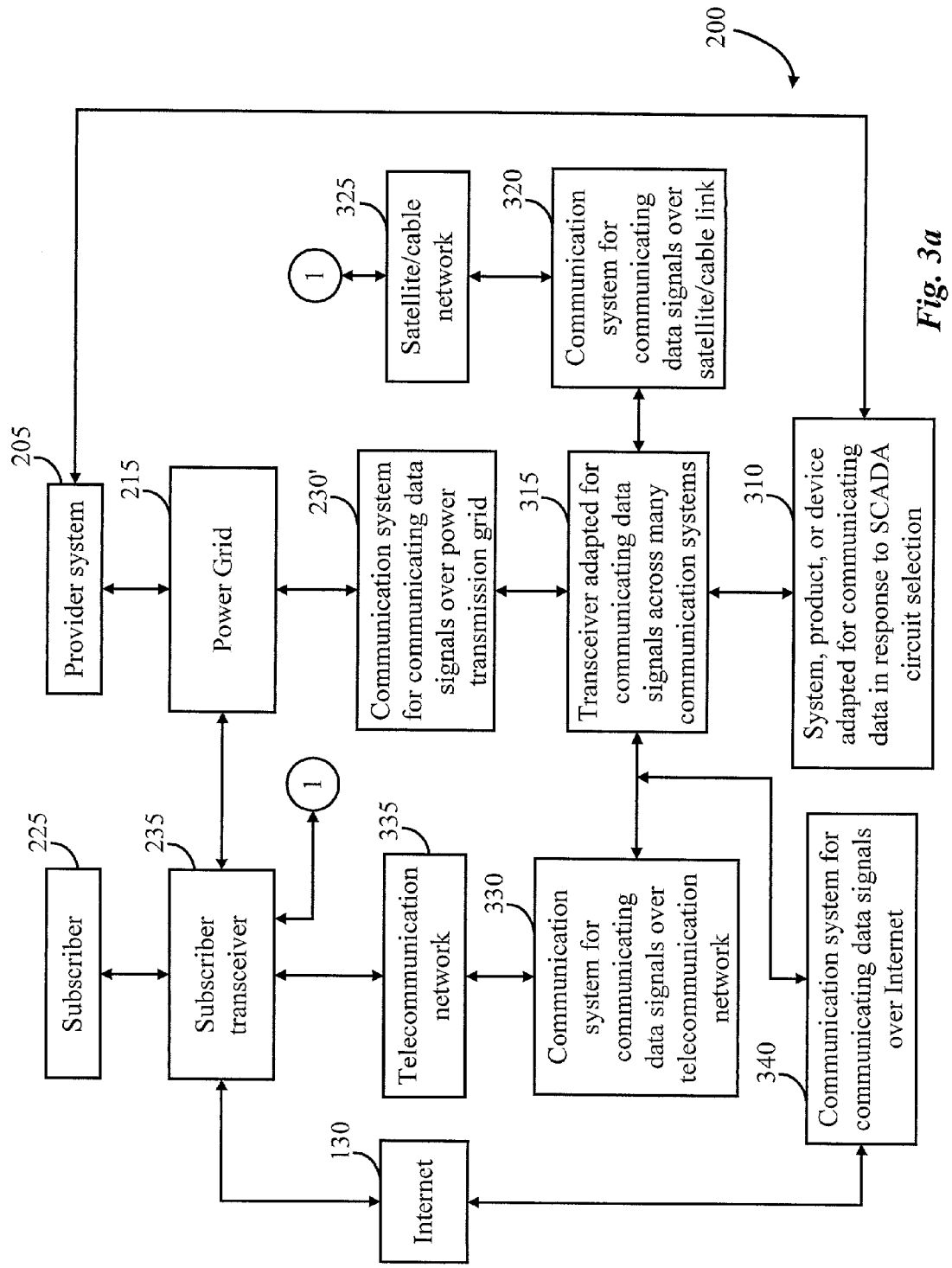
FIG. 3a is a block diagram of an exemplary integrated power and communication system in accordance with the present invention.

FIG. 3a is a block diagram of an exemplary integrated power and communication system. As discussed, the distributed power system 200 includes a power grid 215 in operative association with the provider system 205. When an authorized directive to shed load is received by the utility provider from the ISO, immediate decisions must be made as to which provider circuit breakers 265 are to be switched off in order to comply with the received directive. The utility provider 210 can operate the SCADA/DCS system 220 to assist in selecting which circuits to shed load. A system, product, and/or device 310 adapted for communicating data in response to circuit selection is operatively coupled to the provider system 205 and is also in operative association with a transceiver 315 adapted for communicating data signals across many communication systems 230. Such a device 310 can be a network access apparatus which provides notification services to all subscribers that are directly affected by the selected circuits and such a transceiver 315 can be a router farm used for routing notification data to selected subscribers across a multitude of communication networks.

After the SCADA/DCS system 220 accesses the circuit-subscriber notification database 240, subscribers and their desired method of notification can be retrieved from the database. Data such as encoded data may then be generated for each requested notification method. For example, data A is generated for all affected subscribers who wish to be notified via telephone whereas data B is generated for all affected subscribers who wish to be notified via fax and so forth. Other communication networks for communicating data signals include the power grid 215 itself, satellite/cable networks 325, packet switched networks such as the Internet 130, and telecommunication networks 335 such as Plain Old Telephone System (POTS), Public Switched Telephone Network (PSTN) including PBX and/or Centrex systems, cellular, wireless, pager networks, etc.

The transceiver 315 routes each generated encoded data to its respective communication network. For those subscribers 225 that wish to receive notification via the power grid 215, the transceiver 315 routes encoded data to the communication system 230 for communicating data signals over the power grid. The subscriber transceiver 235 is adapted to receive from the power grid, decode, and filter the encoded data broadcast to determine how to alert the subscriber 225 of the emergency notice. For those subscribers 225 that wish to receive notification via a telecommunication network 335, the transceiver 315 routes encoded data to the communication system 330 for communicating data signals over the appropriate telecommunication network 335. The subscriber transceiver 235 is adapted to receive, decode, and filter the encoded data from the telecommunication network 335 to determine how to alert the subscriber 225 of the emergency notice.

For those subscribers 225 that wish to receive notification via a satellite/cable network 325, the transceiver 315 routes encoded data to the communication system 320 for communicating data signals over the satellite/cable network. The subscriber transceiver 235 is adapted to receive, decode, and filter the encoded data from the satellite/cable network to determine how to alert the subscriber 225 of the emergency notice. Subscribers receiving notification via the Internet 130, the transceiver 315 routes encoded data to the communication system 340 for communicating data signals over the Internet 130. The subscriber transceiver 235 is adapted to receive, decode, and filter the encoded data from the Internet 130 to determine how to alert the subscriber 225 of the emergency notice.

Figure 3B:
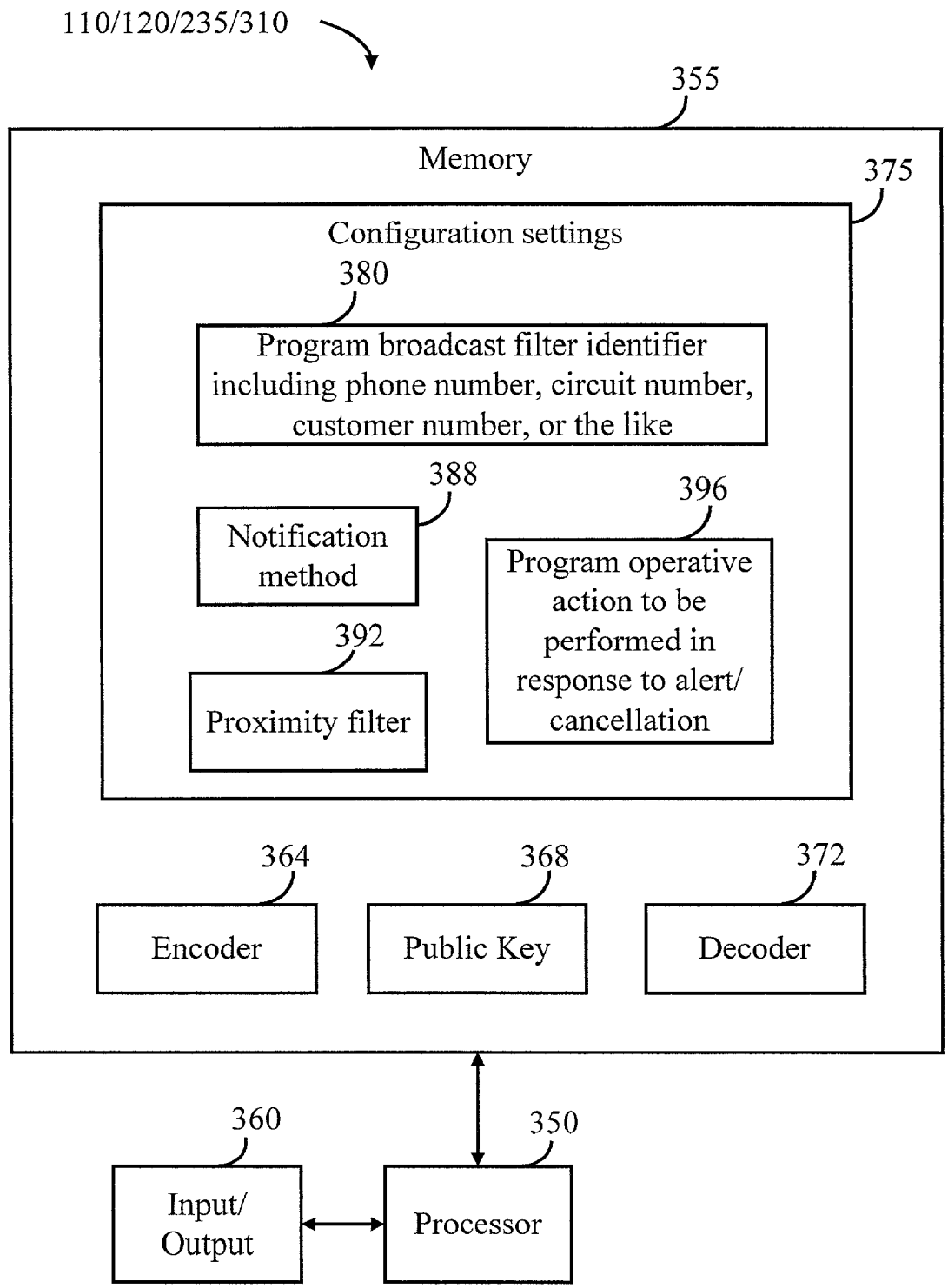
FIG. 3b is a block diagram of an exemplary device for processing notification information in accordance with the present invention.

FIG. 3b is a block diagram of an exemplary device for processing notification information. In a preferred aspect of the present invention, the notification device or system may be any receiver or transceiver such as a subscriber transceiver 235, client computer system 110, or server computer system 120 and the like. The device or system is by no means limited to the use of a transceiver. The present invention does not rely upon the need for a subscriber or any recipient of the notification to transmit any kind of signal or message back to the notification provider, which in this case is the utility provider 210.

The block diagram includes a storage device such as memory 355 in operative association with a processor 350. The processor 350 is operatively coupled to input/output devices 360 in a subscriber transceiver 235, client 110 and/or server 120 computing system and/or subscriber and/or provider system 205. Also included but not shown are a network interface, communication link, an indicator for producing any human perceptible signal such as an audio indicator and visual indicator, and a clock, all of which are connected to the processor 350. The subscriber transceiver 235 is preferably connected to a household power source (not shown) or may include a power source, and/or backup power source, such as a battery, solar cell, or the like (not shown), for providing electrical power to the processor 350 and other electronic components.

Stored in memory 355 may be programs, scripts, and information records 122 having any combination of exemplary content such as lists, files, and databases. Such records may include for example: broadcast filter identifier including a phone number, circuit number, customer number, or the like 380, notification method 388, proximity filter 392, operative actions to be performed in response to alert/cancellation 396. Also included are both encoders 364 and decoders 372, which may also include encrypting/decrypting such coded information through a public key 368 or digital ID to identify and authenticate the validity of notification information. These information records 122 are further introduced and may be discussed in more detail throughout the disclosure of this invention.

In the preferred embodiment, the audio indicator is a speaker. However, it is contemplated that sounds generated from bells, whistles, sirens, buzzers, piezo-electric indicators, and the like can be used in addition to, or in place of a speaker. Provisions can be made on the subscriber transceiver 235 for activating remote sound generating means. Audible sounds may include, but are not limited to, single or plural tones, voice, and the like. In addition, different sounds may be associated with different degrees of urgency and the severity of the emergency notification. It is contemplated that visual the visual indicator may in the form of, but not limited to, LEDs, incandescent lights, fluorescent lights, halogen lights, LCD display panels, fiber optics, electroluminescent panels, moving mechanisms, and the like or in a combination of any of the above.

Figure 4A:
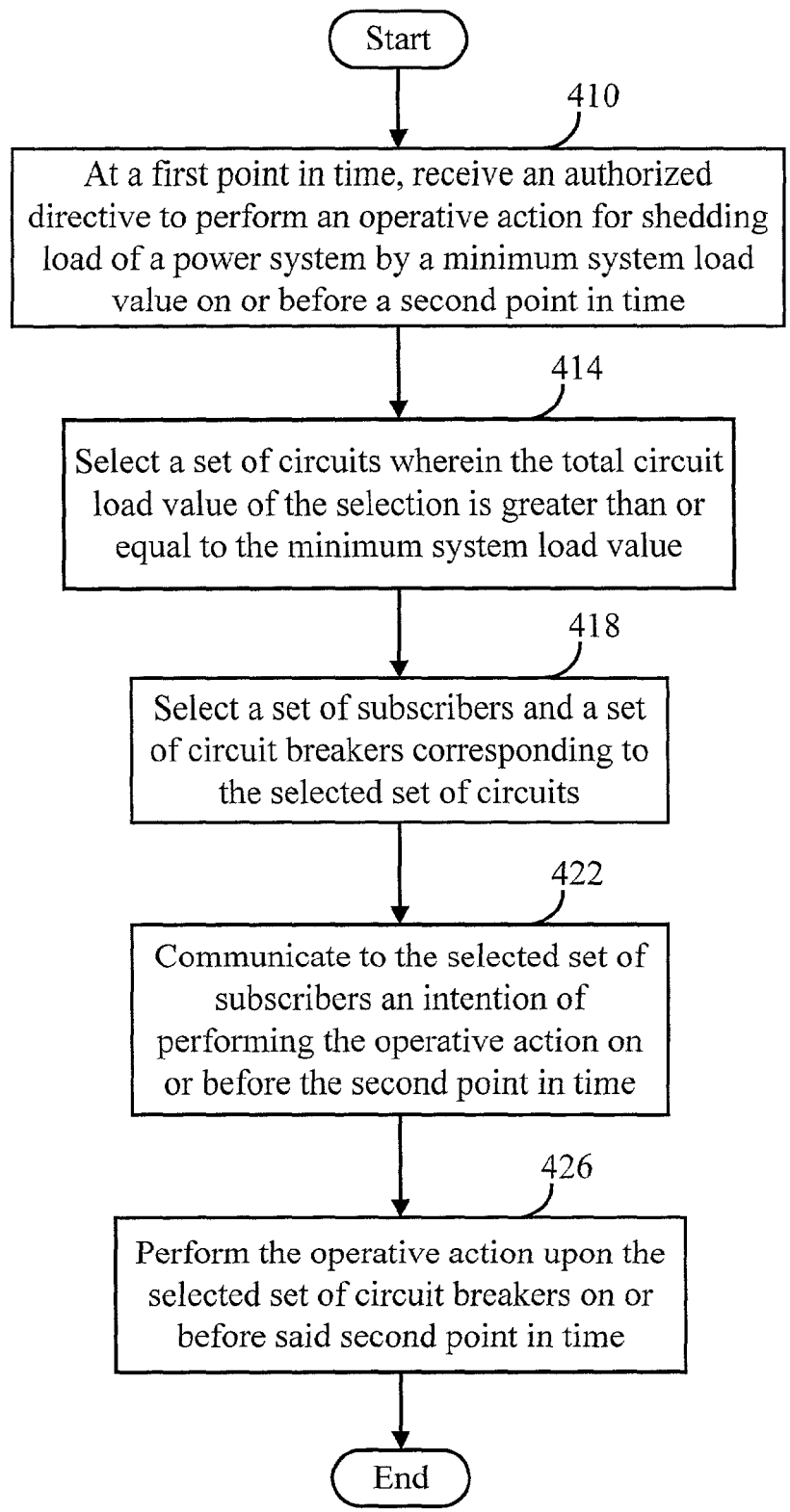
FIG. 4a is a flowchart illustrating the steps performed for providing notification services in accordance with the present invention.

FIG. 4a is a flowchart illustrating the steps performed for providing notification services. At a first time, an authorized directive is received in step 410 by the utility provider 210 from the ISO to perform an operative action for shedding load of a power system by a minimum system load value on or before a second time. The utility provider 210 operates the SCADA/DCS system 220 to assist in selecting a set of circuits in step 414 wherein the total circuit load value of the selection is greater than or equal to the minimum system load value. In response to circuit selection, the SCADA/DCS system 220 selects the corresponding set of circuit breakers and consults the circuit-subscriber notification database 240 to select in step 418 a set of subscribers corresponding to the selected set of circuits.

After subscribers and their desired method of notification are retrieved from the database. Encoded data may then be generated for each requested notification method. A system, product, and/or device 310 adapted for communicating data in response to circuit selection may then be accessed by the SCADA/DCS system 220 to communicate in step 422 to the selected set of subscribers an intention of performing the operative action on or before the second time. The utility provider 210 then program and/or operate the SCADA/DCS system 220 to perform the operative action in step 426 upon the selected set of circuit breakers on or before the second time. The operative action performed in this case is the switching of selected provider circuit breakers 265 to reduce load and comply with the received (step 410) authorized load-shed directive.

The invention is by no means limited to retrieving notification methods and corresponding notification identifiers from the provider side. Notification data may be broadcast to selected subscribers through a multitude of communication systems and/or communication networks where the selection of a preferred subscriber notification method determined upon receipt of such data on the subscriber side. Dynamic circuit identifiers corresponding to each subscriber may also be included in the circuit-subscriber notification database 240 to assure successful real-time delivery of notification data when subscribers may be temporarily assigned to alternate circuits in the event of circuit and/or substation maintenance and the like. The subscriber transceiver 235 may be remotely programmed by the provider reflect in configuration settings for any subscriber circuit changes.

Figure 4B:
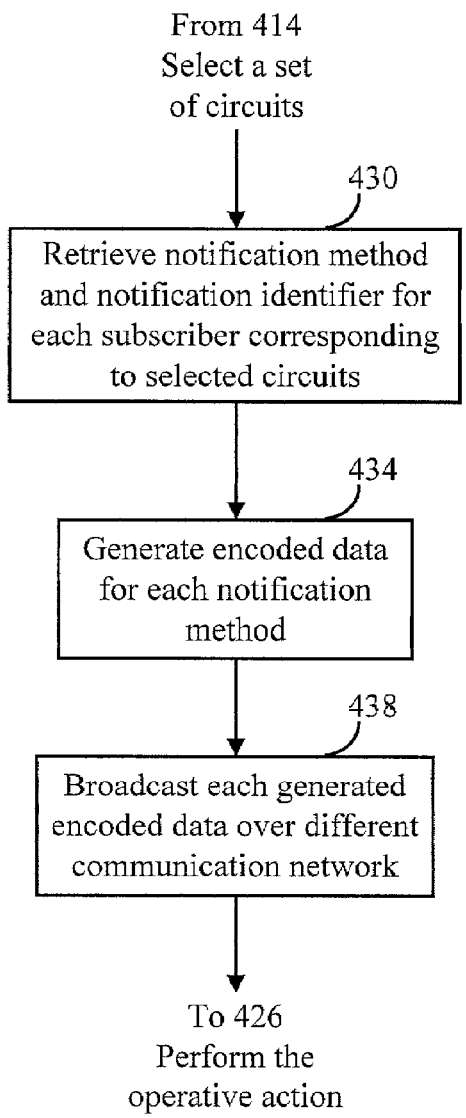
FIG. 4b is a flowchart illustrating the steps performed for generating and broadcasting subscriber notification information in accordance with the present invention.

FIG. 4b is a flowchart illustrating the steps performed for generating and broadcasting subscriber notification information. In response to circuit selection (step 414), a notification method and notification identifier can be retrieved in step 430 from the circuit-subscriber notification database 240 for each subscriber corresponding to the selected circuits. The retrieved identifier may be in correspondence with the selected notification method. Encoded data is generated in step 434 for each notification method. At least one encoded datum is generated for each communication network needed to notify affected subscribers. Each generated encoded data (step 434) are transmitted/communicated in step 438 over each corresponding communication network.

Figure 4C:
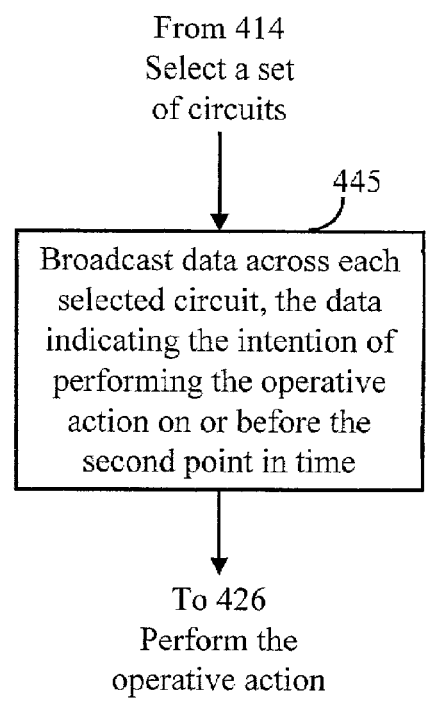
FIG. 4c is a flowchart illustrating the step performed for broadcasting subscriber notification information across the selected circuit in accordance with an aspect of the present invention.

FIG. 4c is a flowchart illustrating the step performed for broadcasting subscriber notification information across the selected circuit in accordance with another aspect of the present invention. In response to circuit selection (step 414), an encoded data signal for each circuit may be generated by and transmitted from in step 445 the SCADA/DCS system 220 via the communication system 230. The communication interface for each selected circuit then receives its respective encoded data signal, communicated across the power grid 215. From the circuit level, the signal is distributed to subscriber receivers via its corresponding subcircuit. In effect, data is directly broadcast across each selected circuit, the data indicating the intention of performing the operative action on or before the second time.

Figures 5A, 5B:
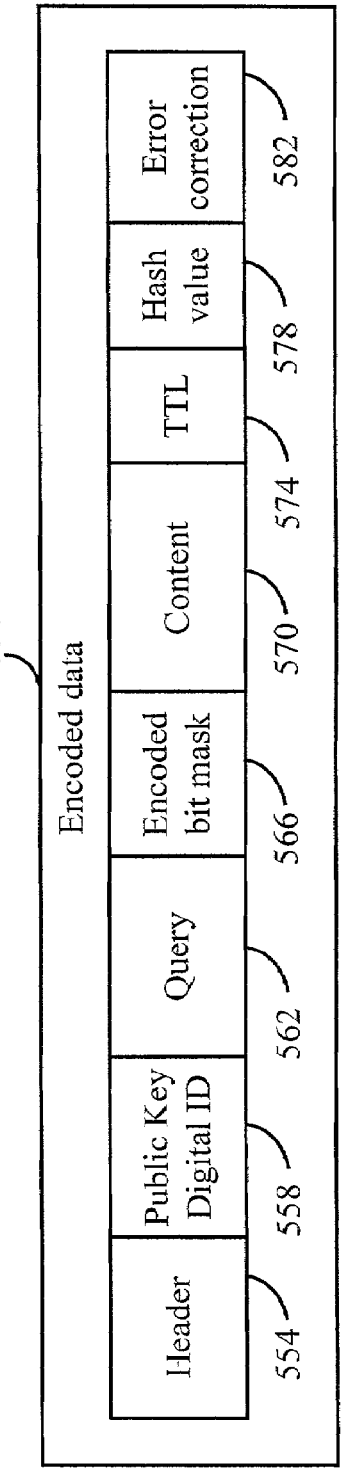
FIG. 5a presents an exemplary table in accordance with the present invention illustrating a data structure for a circuit-subscriber notification database.
FIG. 5b presents an exemplary data structure in accordance with the present invention illustrating encoded data.

FIG. 5a presents an exemplary table illustrating the data structure for a circuit-subscriber notification database 240. Such a database may be comprised of at least one record, list, or file. Data records may include information such as but not limited to method of notification 522, and notification identifiers such as circuit number 514, account number 518, IP address 526, e-mail 530, phone number 534, GPS data 538, ICQ/IM address 542, and Cable ID 546. Also included may be other identifiers such as username and login ID, etc. Phone number 534 may further include numbers such as mobile phone number, fax number, pager number, and ENUM. ENUM is an emerging and is explained in, P. Falstrom, "Informational RFC (Request for Comment) 2916: E.164 number and DNS", Cisco Systems Inc., September 2000, "http://www.faqs.org/rfcslrfc2916.html" by showing how DNS can be used for identifying available services connected to a single E.164 phone number.

Though notification identifiers may be included in existing utility provider account and billing databases, such databases are not in communication with the SCADA/DCS system 220. Currently there is no known means for corresponding circuit selection with customer/subscriber notification preferences. The circuit-subscriber notification database 240 may also comprise relational pointers that correspond SCADA circuit databases with utility provider account and billing databases, so as to provide a means for the SCADA/DCS system 220 to select which subscribers to notify from the plurality of subscribers in response to selecting which circuits to shed load from.

FIG. 5b presents an exemplary data structure in accordance with the present invention illustrating encoded data. The encoded data may be information such as but not limited to header 554, public key and/or digital ID 558, query 562, encoded bit mask 566, content 570, TTL 574, hash value 578, and error correction 582. Content 570 may include the specifics of notification. For instance, content may include notice type and expiration time of notice for any stage alert, warning, and emergency. Content be subscriber specific and dynamically customized for each recipient and further include information such as headline news, stock quotes, sports scores, and advertising, etc.

Figure 6A:
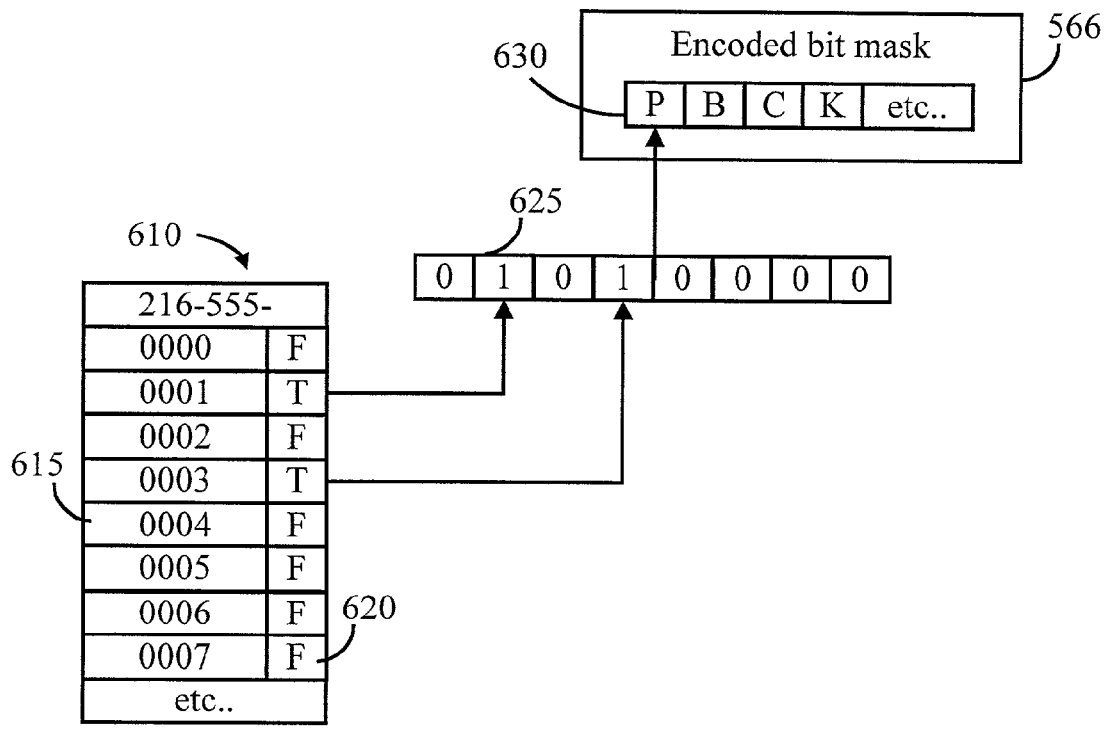
FIG. 6a presents how an exemplary data structure for an encoded bit mask is generated in accordance with the present invention.

FIG. 6a presents how an exemplary data structure for an encoded bit mask is generated. As discussed in U.S. patent application Ser. No. 09/440,606 filed Nov. 15, 1999, by Schneider, entitled "Method and apparatus for information delivery", a query can be used to select a portion of a database and an encoded bit mask may then be used to represent the status of the query to further reduce the generated control data size. Referring now to FIG. 6a, a phone number database 610 representing all telephone numbers for the local exchange "216-555" includes data records, each data record includes at least a phone number data field 615 and status data field 620. Starting from the first record of the phone number database 610 in batches of eight records at a time, an eight bit string composed of 1's and 0's is formed 625 where the logical value of TRUE in the status field 620 for a given record is represented by a 1. The eight-bit string is converted into an equivalent binary value. The binary value is then further converted into its equivalent ASCII character 630. A string of ASCII characters are formed by repeating the steps of encoding the data until the end of the phone number database 610 is reached. The resultant encoded character string referred to as an encoded bit mask 566 may be further included in the encoded data 550.

Figure 6B:
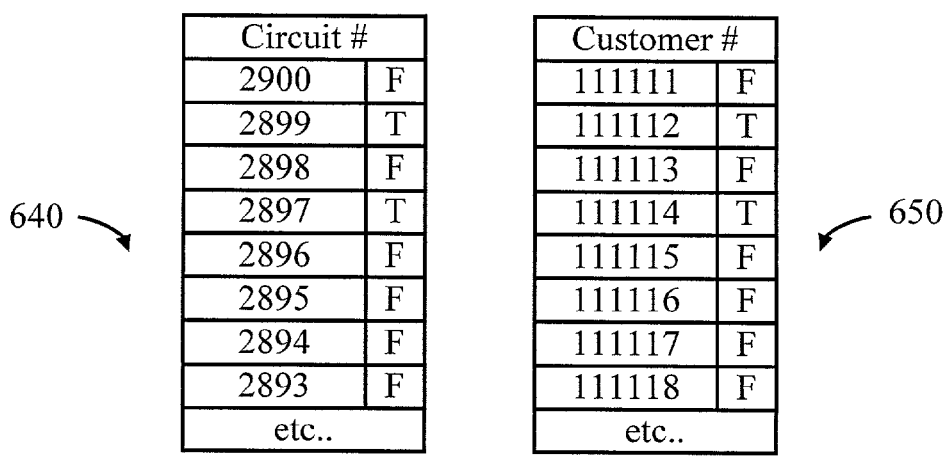
FIG. 6b presents other exemplary tables in accordance with the present invention.

FIG. 6b presents other exemplary tables in accordance with the present invention. Other databases may also include circuit number databases 640, customer number databases 650 or other databases which can be used for preparing encoded data for other communication networks. Regardless of which database and/or communication network is selected, the encoded bit mask 566 serves as a means to target specific customers for a given broadcast area.

Figure 7A:
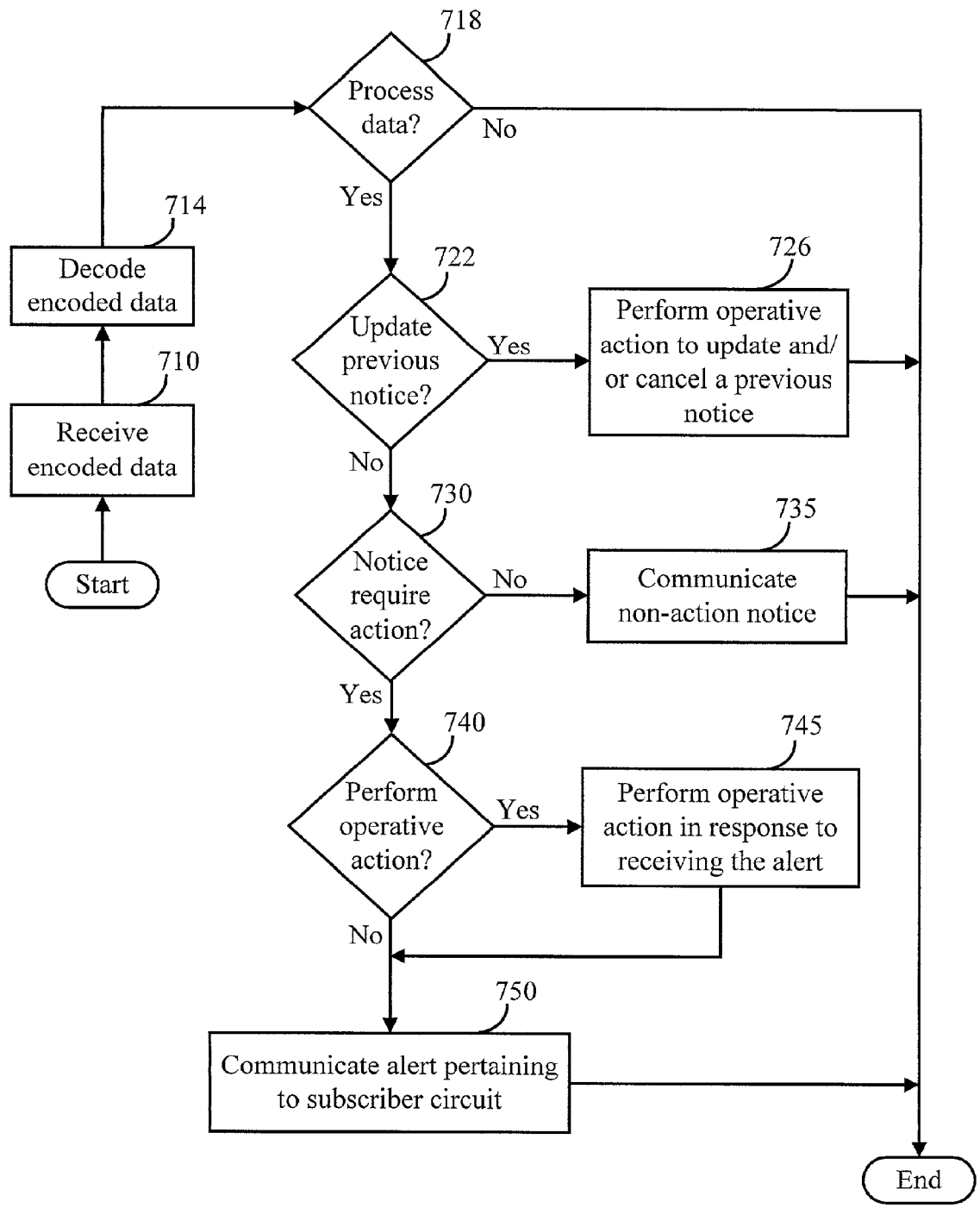
FIG. 7a is a flowchart illustrating the steps performed for receiving subscriber notification information in accordance with the present invention.

FIG. 7a is a flowchart illustrating the steps performed for receiving subscriber notification information in accordance with the present invention. When a device such as a subscriber transceiver 235 or subscriber computer system 110 receives in step 710 subscriber notification information such as encoded data 550, the encoded data is decoded in step 714 by the decoder 372. The decoding process may be similar to the encoding process as discussed in conjunction with FIG. 6a. Each ASCII character is translated into a bit stream to generated the bit mask, for example. When data is received as a broadcast, it is typical for all subscriber transceivers to receive (step 710) and decode (step 714) the data. Each subscriber transceiver includes a unique identifier for the purpose of filtering the notification signal.

When it is determined in step 718 that received data is to be processed, it is then further determined in step 722 whether the notification data is an update to a previous notice. When this is the case, the subscriber transceiver 235 may then signal an existing client/subscriber network to perform in step 726 an operative action to update or cancel a previous notice. If not, it is then further determined in step 730 whether the notification data is a notice that requires an action. If not, a non-action notice may be communicated in step 735. For instance, the parameters of the proximity filter 392 may be used to distinguish whether the notification signal may serve as an indicator of an action notice that a neighbor subscriber may be receiving. When the notice is determined in step 730 to be an alert, warning, or emergency it is further determined in step 740 whether an operative action is performed in response to the notice. If so, then an operative action is performed in step 745 in response to receiving the notice. After the operative action is performed, or when no action has been performed, the notification signal is then communicated in step 750 to the subscriber. For instance the subscriber operative action may initiate emergency procedures to be automatically performed upon at least one device, the device including elevators, gas and fuel line switches, computer systems, traffic and transportation control systems, municipal electrical and emergency systems, and lighting and audible warning systems.

Figure 7B:
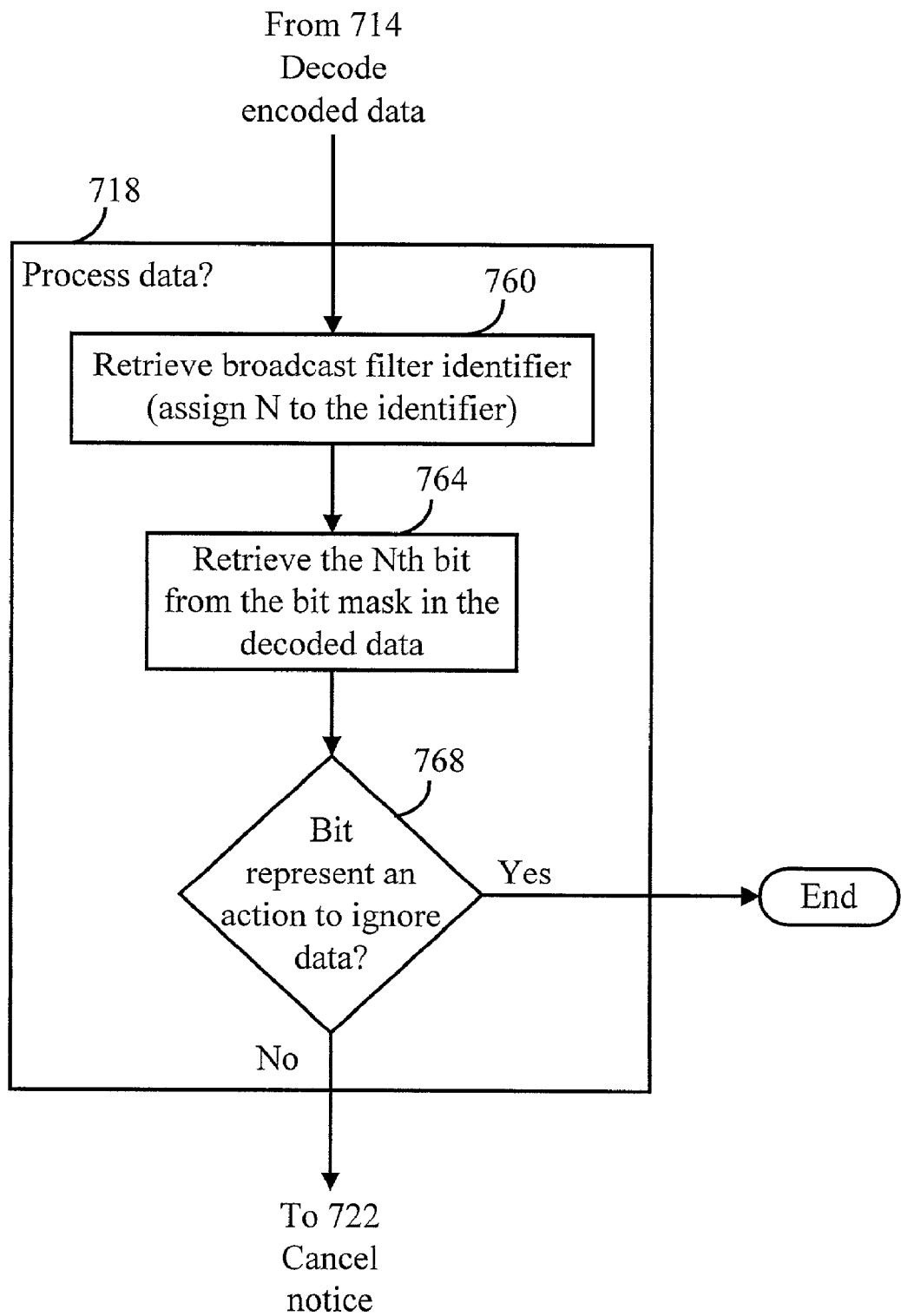
FIG. 7b is a flowchart illustrating the steps performed for determining whether to process subscriber notification information in accordance with the present invention.

FIG. 7b is a flowchart illustrating the steps performed for determining whether to process subscriber notification information. After data is decoded (step 714), the broadcast filter identifier 380 is retrieved in step 760 from the subscriber transceiver 235. The filter identifier is typically a number representing a phone number, customer number, and/or circuit number depending upon which communication network 100 is used to receive the notification data. With the identifier equaling a number N, the Nth bit from the bit mask of the decoded data may be retrieved in step 764 and used to determine in step 768 whether the selected bit represents an action to ignore the notification data. When an action is determined not to ignore notification data, it is then further determined in step 722 whether the notification data is a cancellation notice.

By providing robust, scalable, distributed, optimized notification delivery solutions, customers are better informed to make energy saving decisions, resulting in reduced costs while providing increased power grid stability due to speedier customer load shed implementations. More specifically, the invention communicates peak times as outlined in the interruptible service program to utility customers and customer key personnel, so electric load is reduced on the power grid, and rotating power outages may be avoided, and customers are not penalized for non-compliance.

Figure 8:
FIG. 8 is an illustration of a utility bill that may be sent to a utility customer/subscriber in accordance with the present invention.

FIG. 8 is an illustration of a utility bill that may be sent to a customer. In addition, to the block/group number listed on current utility bills, additional identifiers may be included for the purpose of enabling customers, end-users, subscribers, and the like to program a subscriber transceiver 235 to receive more precise circuit specific targeted notification. One such included identifier can be a circuit identifier 780, which is presented as circuit number—1958 on the utility bill.

To summarize other aspects of the present invention the selected set of circuits can be selected from the plurality of circuits in response to receiving an authorized directive. In turn, the selected set of subscribers can be selected from the plurality of subscribers in response to selecting the set of circuits. The set of circuit breakers corresponding to the selected set of circuits can be selected from the plurality of circuit breakers. The selected set of circuit breakers can be selected from the plurality of circuit breakers in response to selecting the set of circuits. The operative action can be performed upon the selected set of circuit breakers on or before the second time.

The authorized directive can be one of a warning, alert, and emergency notice from one of a power transmission owner and utility distribution company and the authority is one of a governing or control authority, utility provider, independent system operator, and authorized sole-source provider. Circuits may be selected by calculating the total circuit load value from the circuit load value of each selected circuit. Subscribers may be selected by determining which subscribers from the plurality of subscribers may be affected upon performing the provider operative action.

Subscriber information may be accessed by retrieving at least one of a notification method and notification identifier from a circuit-subscriber notification database. The notification identifier may include at least one of a group, block, circuit, IP address, GPS coordinates, e-mail address, instant message address, cable ID address, username, login ID, phone number, mobile phone number, fax number, pager number, and ENUM. The received information may include encoded data having at least one of a header, public key, digital ID, query, encoded bit mask, content, time-to-live value, hash value, error correction, headline news, stock quotes, sports scores, and advertising. The encoded bit mask may represent a subset of subscribers from the plurality of subscribers.

The communication network may be one of a public switched telephone network (PSTN), packet switched network, satellite communication network, cable network, pager network, and cellular network. Circuits and subscribers may be selected notification information communicated from the control system. A provider transceiver adapted for communicating data signals over a plurality of communication systems is in operative association with the control system and a communication system may be selected from a plurality of communication systems to communicate information by transmitting information via the provider transceiver over the selected communication system. The control system may be at least one of a SCADA system and distributed control system (DCS).

Each circuit breaker of a circuit is a provider circuit breaker that can be powered off by the control system. Each circuit includes at least one subcircuit and at least one circuit communication interface, each subcircuit having a subcircuit load, at least one subcircuit communication interface, and at least one subscriber circuit breaker. The circuit communication interface and the subcircuit communication interface may be one of a power line carrier communications interface, telephone line power communications interface, hardwired interface, RF interface, broadband modem, RS-232 interface, CEBus interface, X.10 interface, and building automation interface. Remote terminal units may be in operative association with the circuit communication interface and automated meter readers in operative association with the subcircuit communication interface.

The power grid may include a data communication system for contemporaneously broadcasting data signals over the power grid to the plurality of circuits and subcircuits. The data communication system may broadcast data signals via at least one of a circuit communication interface and subcircuit communication interface.

The communication network can be a telecommunication network, the telecommunication network including a data communication system for broadcasting data signals over the telecommunication network. The telecommunication network may include at least one local exchange carrier connecting a plurality of telecommunication subscribers with the local exchange carrier via at least one communication link, each telecommunication subscriber having at least one customer premise equipment. Information may be contemporaneously broadcast from the local exchange carrier to each customer premise equipment via each communication link. The communication link can be at least one of a wireless link, local loop, twisted pair, coaxial, fiber, hybrid fiber coaxial, broadband, RF, telephony, hybrid RF/telephony, and satellite.

A subscriber transceiver adapted for receiving data signals from a plurality of communication systems is in operative association with the communication network. The subscriber transceiver may include at least one of a self contained power source, network interface, telecommunication interface, clock, visual indicator, audio indicator, encoder, decoder, public key, digital ID, and modifiable configuration settings. Modifiable configuration settings can be modified by at least one of a provider and subscriber and can include settings such as a broadcast filter identifier, notification method, notification identifier, proximity filter, and subscriber operative action settings. The broadcast filter identifier can be one of a phone number, customer number, circuit number, block number, and group number.

At least a portion of received information may be communicated to subscriber personnel in response to receiving information from the communication network. The subscriber transceiver may receive encoded data from the communication network. Encoded data may be decoded and determined whether to be processed in response to receiving the encoded data from the communication network. The decoded data may include a bit mask and compared to the broadcast filter identifier from the modifiable configuration settings to determine whether to process data.

A first subscriber operative action to update or cancel a previous notification may be performed in response to processing decoded data. It may be further determined whether received information requires an action to be performed. If not, a non-action notice may be communicated to the subscriber. A second subscriber operative action in response to determining may also be performed or an action notice may be communicated to the subscriber in response determining that the second subscriber operative action is not to be performed. In addition, emergency procedures may be automatically performed upon at least one device (may be coupled to a building automation network), the device including elevators, gas and fuel line switches, computer systems, traffic and transportation control systems, municipal electrical and emergency systems, and lighting and audible warning systems.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. In a power system having a power grid providing electrical power to a plurality of subscribers, the power system configured to provide advance notification to each subscriber whose electrical load is to be entirely shed from the power grid, the power system further including a plurality of providers providing electrical power services to the plurality of subscribers, and a control authority independent of said plurality of providers, said control authority determining when electrical load must be shed from the power grid, a method comprising:

providing a notification database of the selection of which of a plurality of notification methods is desired by each said subscriber to be used for notifying at least one subscriber of the plurality of subscribers of an impending change in the connection of the entire electrical load of said at least one subscriber to the power grid;

the control authority issuing to at least one of the plurality of providers a directive to perform an operative action for shedding electrical load to the power grid wherein a performance of the operative action is only capable of being performed by said at least one provider and incapable of being performed by any said subscriber, determining which of the plurality of subscribers, is to have electrical load entirely shed from the power grid;

automatically determining from the notification database which of said plurality of notification methods are to be used for notifying said at least one subscriber of the impending change in the connection of the entire electrical load of said at least one subscriber to the power grid in response to said determining which of the plurality of subscribers is to have electrical load entirely shed from the power grid; and, notifying said at least one subscriber by the at least one notification method in said notification database prior to performance of the operative action.

2. A method, as set forth in claim 1, the power system further including at least one control system for operating at least a portion of the power grid, the power grid further including a plurality of provider circuits and a plurality of provider circuit breakers, each said circuit having a provider circuit load value and at least one provider circuit breaker only under control of said at least one provider, wherein the control authority issuing to at least one of the plurality of providers a directive includes at least one of the plurality of providers receiving said authorized directive at a first time to perform an operative action for shedding load from the power system by a minimum system load value on or before a second time.

3. A method, as set forth in claim 2, wherein a total provider circuit load value of said selected set of provider circuits is greater than or equal to said minimum system load value, and said determining which of the plurality of subscribers is to have electrical load entirely shed from the power grid includes selecting a set of provider circuits from the plurality of provider circuits, and selecting a set of subscribers from the plurality of subscribers, said set of subscribers corresponding to said selected set of provider circuits.

4. A method, as set forth in claim 3, wherein said determining from the notification database which notification method is to be used for notifying said at least one subscriber of the impending change in the connection of the entire electrical load of said at least one subscriber to the power grid includes accessing a circuit-notification database operatively coupled to said at least one control system, said circuit-notification database having data records corresponding to said plurality of subscribers receiving service from said selected set of provider circuits wherein each said data record includes at least one of a notification method and notification identifier corresponding to each said subscriber.

5. A method, as set forth in claim 4, further including a communication network operatively coupled to said at least one control system and in communication with the plurality of subscribers wherein said notifying said at least one subscriber by the at least one method in said notification database prior to performance of the operative action includes communicating information to said selected set of subscribers in accordance with said at least one notification method, said information including an intention of performing said operative action on or before said second time.

6. A method, as set forth in claim 5, wherein said selecting said set of provider circuits includes the selecting said set of provider circuits from the plurality of provider circuits in response to receiving said authorized directive.

7. A method, as set forth in claim 5, wherein said selecting said set of subscribers includes the selecting said set of subscribers from the plurality of subscribers in response to selecting said set of provider circuits.

8. A method, as set forth in claim 5, further including the selecting a set of provider circuit breakers from the plurality of provider circuit breakers, said set of provider circuit breakers corresponding to said selected set of provider circuits.

9. A method, as set forth in claim 8, wherein said selecting said set of provider circuit breakers includes the selecting said set of provider circuit breakers from the plurality of provider circuit breakers in response to selecting said set of provider circuits.

10. A method, as set forth in claim 8, further including the performing said operative action upon said selected set of provider circuit breakers on or before said second time.

11. A method, as set forth in claim 5, wherein said directive is one of a warning, alert, and emergency notice and said receiving said directive includes the utility provider receiving said directive from said control authority.

12. A method, as set forth in claim 11, wherein said utility provider is one of a power transmission owner and utility distribution company and said control authority is one of a governing authority, independent system operator, and authorized sole-source provider.

13. A method, as set forth in claim 5, wherein said selecting said set of provider circuits includes the calculating said total provider circuit load value from the provider circuit load value of each said selected provider circuit.

14. A method, as set forth in claim 5, wherein said selecting said set of subscribers includes the determining which subscribers from the plurality of subscribers subscription can be affected upon performing said operative action.

15. A method, as set forth in claim 14, wherein said determining which subscribers from the plurality of subscribers includes the retrieving data from a circuit-subscriber notification database.

16. A method, as set forth in claim 15, wherein said data includes at least one of a notification method and notification identifier, said notification identifier having at least one of a group, block, circuit, IP address, GPS coordinates, e-mail address, instant message address, cable ID address, username, login ID, phone number, mobile phone number, fax number, pager number, and ENUM.

17. A method, as set forth in claim 5, wherein said information includes encoded data.

18. A method, as set forth in claim 17, wherein said encoded data includes at least one of a header, public key, digital ID, query, encoded bit mask, content, time-to-live value, hash value, error correction, headline news, stock quotes, sports scores, and advertising.

19. A method, as set forth in claim 18, wherein said encoded bit mask represents a subset of subscribers from the plurality of subscribers.

20. A method, as set forth in claim 5, wherein said communication network is one of a public switched telephone network (PSTN), packet switched network, satellite communication network, cable network, pager network, and cellular network.

21. A method, as set forth in claim 5, wherein said set of provider circuits and said set of subscribers are selected from the control system.

22. A method, as set forth in claim 5, wherein said communicating said information includes the communicating said information from the control system in response to selecting said set of provider circuits.

23. A method, as set forth in claim 5, wherein a provider transceiver adapted for communicating data signals over a plurality of communication systems is in operative association with the control system and said communicating said information from the control system includes the steps of selecting a communication system from said plurality of communication systems to communicate said information by transmitting said information via said provider transceiver over said selected communication system.

24. A method, as set forth in claim 5, wherein the control system is at least one of a SCADA system and distributed control system.

25. A method, as set forth in claim 10, wherein, said operative action is a provider operative action and said performing said provider operative action includes the switching off power to said selected set of said provider circuit breakers from the control system.

26. A method, as set forth in claim 5, wherein each said provider circuit includes at least one subscriber subcircuit and at least one provider circuit communication interface, each said subscriber subcircuit having a subscriber subcircuit load, at least one subscriber subcircuit communication interface, and at least one subscriber circuit breaker.

27. A method, as set forth in claim 26, wherein said provider circuit communication interface and said subscriber subcircuit communication interface is one of a power line carrier communications interface, telephone line power communications interface, hardwired interface, RF interface, broadband modem, RS-232 interface, CEBus interface, X.10 interface, and building automation interface.

28. A method, as set forth in claim 26, wherein at least one remote terminal unit is in operative association with said provider circuit communication interface and at least one automated meter reader is in operative association with said subscriber subcircuit communication interface.

29. A method, as set forth in claim 26, wherein the power grid includes a data communication system for contemporaneously broadcasting data signals over the power grid to the plurality of provider circuits and subscriber subcircuits.

30. A method, as set forth in claim 29, wherein said data communication system broadcasts said data signals via at least one of a provider circuit communication interface and subscriber subcircuit communication interface.

31. A method, as set forth in claim 5, wherein said communication network is a telecommunication network, said telecommunication network including a data communication system for broadcasting data signals over said telecommunication network.

32. A method, as set forth in claim 31, wherein said telecommunication network includes at least one local exchange carrier connecting a plurality of telecommunication subscribers with said local exchange carrier via at least one communication link, each said telecommunication subscriber having at least one customer premise equipment and said communicating said information includes the contemporaneously broadcasting said information from said local exchange carrier to each said customer premise equipment via each said communication link.

33. A method, as set forth in claim 32, wherein said communication link is at least one of a wireless link, local loop, twisted pair, coaxial, fiber, hybrid fiber coaxial, broadband, RF, telephony, hybrid RF/telephony, and satellite.

34. A method, as set forth in claim 5, wherein a subscriber transceiver adapted for receiving data signals from a plurality of communication systems is in operative association with said communication network.

35. A method, as set forth in claim 34, wherein said subscriber transceiver includes at least one of a self contained power source, network interface, telecommunication interface, clock, visual indicator, audio indicator, encoder, decoder, public key, digital ID, and modifiable configuration settings.

36. A method, as set forth in claim 35, further including the modifying said modifiable configuration settings by at least one of a provider and subscriber.

37. A method, as set forth in claim 36, wherein said modifiable configuration settings include one of a broadcast filter identifier, notification method, notification identifier, proximity filter, and subscriber operative action settings.

38. A method, as set forth in claim 37, wherein said broadcast filter identifier is one of a phone number, customer number, circuit number, block number, and group number.

39. A method, as set forth in claim 34, wherein said information is encoded data and further including the said subscriber transceiver receiving said encoded data from the communication network.

40. A method, as set forth in claim 39, further including the decoding said encoded data in response to receiving said encoded data from the communication network.

41. A method, as set forth in claim 40, further including the determining whether to process said decoded data.

42. A method, as set forth in claim 41, wherein said decoded data includes a bit mask and said determining whether to process said decoded data includes the steps of retrieving a broadcast filter identifier from said modifiable configuration settings and comparing said broadcast filter identifier to said bit mask.

43. A method, as set forth in claim 41, further including the performing a first subscriber operative action to update or cancel a previous notification in response to processing said decoded data.

44. A method, as set forth in claim 34, further including the determining whether said received information requires an action to be performed.

45. A method, as set forth in claim 44, further including the communicating a non-action notice to said subscriber in response to determining that said received information does not require said action to be performed and determining whether to perform said second subscriber operative action in response to determining that said received information does require said action to be performed.

46. A method, as set forth in claim 45, further including the performing said second subscriber operative action in response to determining that said second subscriber operative action is to be performed and communicating an action notice to said subscriber in response determining that said second subscriber operative action is not to be performed.

47. A method, as set forth in claim 46, wherein said performing said second subscriber operative action includes the automatically performing emergency procedures upon at least one device, said device including elevators, gas and fuel line switches, HVAC systems, computer systems, traffic and transportation control systems, municipal electrical and emergency systems, and lighting and audible warning systems.

48. In a power system having a power grid providing electrical power to a plurality of subscribers, the power system configured to provide advance notification to each subscriber whose electrical load is to be entirely shed from the power grid, the power system further including a plurality of providers providing electrical power services to the plurality of subscribers, and a control authority independent of said plurality of providers, said control authority determining when electrical load must be shed from the power grid, an apparatus comprising:

a notification database of the selection of which of a plurality of notification methods is desired by each said subscriber to be used for notifying at least one subscriber of the plurality of subscribers of an impending change in the connection of the entire electrical load of said at least one subscriber to the power grid;

means for the control authority issuing to at least one of the plurality of providers a directive to perform an operative action for shedding electrical load to the power grid wherein a performance of the operative action is only capable of being performed by said at least one provider and incapable of being performed by any said subscriber;

means for determining which of the plurality of subscribers is to have electrical load entirely shed from the power grid;

means for determining from the notification database which of said plurality of notification methods are to be used for notifying said at least one subscriber of the impending change in the connection of the entire electrical load of said at least one subscriber to the power grid in response to said determining which of the plurality of subscribers is to have electrical load entirely shed from the power grid; and, means for notifying said at least one subscriber by the at least one notification method in said notification database prior to performance of the operative action.

* * * * *